(12) United States Patent
Dowling et al.

(10) Patent No.: US 7,309,965 B2
(45) Date of Patent: Dec. 18, 2007

(54) UNIVERSAL LIGHTING NETWORK METHODS AND SYSTEMS

(75) Inventors: Kevin J. Dowling, Westford, MA (US); Frederick M. Morgan, Quincy, MA (US); Ihor A. Lys, Milton, MA (US); Michael K. Blackwell, Milton, MA (US)

(73) Assignee: Color Kinetics Incorporated, Boston, MA (US)

( * ) Notice: Subject to any disclaimer, the term of this patent is extended or adjusted under 35 U.S.C. 154(b) by 314 days.

(21) Appl. No.: 10/367,642

(22) Filed: Feb. 14, 2003

(65) Prior Publication Data

US 2003/0222587 A1 Dec. 4, 2003

Related U.S. Application Data

(63) Continuation of application No. 09/663,969, filed on Sep. 19, 2000, now Pat. No. 6,548,967, which is a continuation-in-part of application No. 09/425,770, filed on Oct. 22, 1999, now Pat. No. 6,150,774, which is a continuation of application No. 08/920,156, filed on Aug. 26, 1997, now Pat. No. 6,016,038, said application No. 09/663,969 is a continuation-in-part of application No. 09/333,739, filed on Jun. 15, 1999, and a continuation-in-part of application No. 09/215,624, filed on Dec. 17, 1998, now Pat. No. 6,528,954, and a continuation-in-part of application No. 09/213,537, filed on Dec. 17, 1998, now Pat. No. 6,292,901, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,548, filed on Dec. 17, 1998, now Pat. No. 6,166,496, and a continuation-in-part of application No. 09/213,581, filed on Dec. 17, 1998, now Pat. No. 7,038,398, and a continuation-in-part of application No. 09/213,659, filed on Dec. 17, 1998, now Pat. No. 6,211,626, and a continuation-in-part of application No. 09/213,540, filed on Dec. 17, 1998, now Pat. No. 6,720,745, application No. 10/367,642, which is a continuation-in-part of application No. 09/971,367, filed on Oct. 4, 2001, now Pat. No. 6,788,011, and a continuation-in-part of application No. 09/924,119, filed on Aug. 7, 2001, now abandoned, and a continuation-in-part of application No. 09/669,121, filed on Sep. 25, 2000, now Pat. No. 6,806,659, said application No. 09/215,624.

(60) Provisional application No. 60/223,491, filed on Aug. 7, 2000, provisional application No. 60/090,920, filed on Jun. 26, 1998, provisional application No. 60/079,285, filed on Mar. 25, 1998, provisional application No. 60/078,861, filed on Mar. 20, 1998, provisional application No. 60/068,792, filed on Dec. 24, 1997, provisional application No. 60/071,281, filed on Dec. 17, 1997.

(51) Int. Cl.
*H05B 37/00* (2006.01)

(52) U.S. Cl. .................. 315/318; 315/312; 315/362; 345/505; 340/825.72; 362/227; 362/800

(58) Field of Classification Search ........... 340/825.72, 340/603, 632, 853.1, 825.06, 825.71; 702/188, 702/24; 376/491, 419; 362/85, 230, 231, 362/259, 293–295, 364, 800, 227; 235/454, 235/462.42, 462.46; 700/3; 315/149, 153, 315/158, 295, 297, 307, 312, 315, 321, 360, 315/362, 318; 709/220, 230, 232; 710/9, 710/12, 33, 36; 345/501, 502, 505
See application file for complete search history.

(56) References Cited

U.S. PATENT DOCUMENTS

| | | |
|---|---|---|
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |

| Patent | Date | Inventor | | Patent | Date | Inventor |
|---|---|---|---|---|---|---|
| 3,643,088 A | 2/1972 | Osteen et al. | | 5,078,039 A | 1/1992 | Tulk et al. |
| 3,746,918 A | 7/1973 | Drucker et al. | | 5,083,063 A | 1/1992 | Brooks |
| 3,818,216 A | 6/1974 | Larraburu | | 5,086,385 A | 2/1992 | Launey et al. |
| 3,832,503 A | 8/1974 | Crane | | 5,113,498 A | 5/1992 | Evan et al. |
| 3,858,086 A | 12/1974 | Anderson et al. | | 5,126,634 A | 6/1992 | Johnson |
| 3,909,670 A | 9/1975 | Wakamatsu et al. | | 5,128,595 A | 7/1992 | Hara |
| 3,924,120 A | 12/1975 | Cox, III | | 5,134,387 A | 7/1992 | Smith et al. |
| 3,958,885 A | 5/1976 | Stockinger et al. | | 5,142,199 A | 8/1992 | Elwell |
| 3,974,637 A | 8/1976 | Bergey et al. | | 5,154,641 A | 10/1992 | McLaughlin |
| 4,001,571 A | 1/1977 | Martin | | 5,164,715 A | 11/1992 | Kashiwabara et al. |
| 4,054,814 A | 10/1977 | Fegley et al. | | 5,184,114 A | 2/1993 | Brown |
| 4,082,395 A | 4/1978 | Donato et al. | | 5,194,854 A | 3/1993 | Havel |
| 4,096,349 A | 6/1978 | Donato | | 5,209,560 A | 5/1993 | Taylor et al. |
| 4,241,295 A | 12/1980 | Williams, Jr. | | 5,225,765 A | 7/1993 | Callahan et al. |
| 4,271,408 A | 6/1981 | Teshima et al. | | 5,226,723 A | 7/1993 | Chen |
| 4,272,689 A | 6/1981 | Crosby et al. | | 5,254,910 A | 10/1993 | Yang |
| 4,273,999 A | 6/1981 | Pierpoint | | 5,256,948 A | 10/1993 | Boldin et al. |
| 4,298,869 A | 11/1981 | Okuno | | 5,278,542 A | 1/1994 | Smith et al. |
| 4,329,625 A | 5/1982 | Nishizawa et al. | | 5,282,121 A | 1/1994 | Bornhorst et al. |
| 4,367,464 A | 1/1983 | Kurahashi et al. | | 5,294,865 A | 3/1994 | Haraden |
| 4,388,567 A | 6/1983 | Yamazaki et al. | | 5,307,295 A | 4/1994 | Taylor et al. |
| 4,388,589 A | 6/1983 | Molldrem, Jr. | | 5,329,431 A | 7/1994 | Taylor et al. |
| 4,392,187 A | 7/1983 | Bornhorst | | 5,350,977 A | 9/1994 | Hamamoto et al. |
| 4,420,711 A | 12/1983 | Takahashi et al. | | 5,357,170 A | 10/1994 | Luchaco et al. |
| 4,500,796 A | 2/1985 | Quin | | 5,371,618 A | 12/1994 | Tai et al. |
| 4,622,881 A | 11/1986 | Rand | | 5,374,876 A | 12/1994 | Horibata et al. |
| 4,625,152 A | 11/1986 | Nakai | | 5,375,043 A | 12/1994 | Tokunaga |
| 4,635,052 A | 1/1987 | Aoike et al. | | 5,388,357 A | 2/1995 | Malita |
| 4,647,217 A | 3/1987 | Havel | | 5,402,702 A | 4/1995 | Hata |
| 4,656,398 A | 4/1987 | Michael et al. | | 5,404,282 A | 4/1995 | Klinke et al. |
| 4,668,895 A | 5/1987 | Schneiter | | 5,406,176 A | 4/1995 | Sugden |
| 4,682,079 A | 7/1987 | Sanders et al. | | 5,410,328 A | 4/1995 | Yoksza et al. |
| 4,686,425 A | 8/1987 | Havel | | 5,412,284 A | 5/1995 | Moore et al. |
| 4,687,340 A | 8/1987 | Havel | | 5,412,552 A | 5/1995 | Fernandes |
| 4,688,154 A | 8/1987 | Nilssen | | 5,420,482 A | 5/1995 | Phares |
| 4,688,869 A | 8/1987 | Kelly | | 5,421,059 A | 6/1995 | Leffers, Jr. |
| 4,695,769 A | 9/1987 | Schweickardt | | 5,432,408 A | 7/1995 | Matsuda et al. |
| 4,701,669 A | 10/1987 | Head et al. | | 5,436,535 A | 7/1995 | Yang |
| 4,705,406 A | 11/1987 | Havel | | 5,450,301 A | 9/1995 | Waltz et al. |
| 4,707,141 A | 11/1987 | Havel | | 5,461,188 A | 10/1995 | Drago et al. |
| 4,727,289 A | 2/1988 | Uchida | | 5,463,280 A | 10/1995 | Johnson |
| 4,740,882 A | 4/1988 | Miller | | 5,465,144 A | 11/1995 | Parker et al. |
| 4,753,148 A | 6/1988 | Johnson | | 5,489,827 A | 2/1996 | Xia |
| 4,771,274 A | 9/1988 | Havel | | 5,491,402 A | 2/1996 | Small |
| 4,780,621 A | 10/1988 | Bartleucci et al. | | 5,504,395 A | 4/1996 | Johnson et al. |
| 4,783,137 A * | 11/1988 | Kosman et al. ............... 385/53 | | 5,519,496 A | 5/1996 | Borgert et al. |
| 4,818,072 A | 4/1989 | Mohebban | | 5,519,878 A * | 5/1996 | Dolin, Jr. .................... 709/220 |
| 4,837,565 A | 6/1989 | White | | 5,539,393 A | 7/1996 | Barfod |
| 4,843,627 A | 6/1989 | Stebbins | | 5,545,950 A | 8/1996 | Cho |
| 4,845,481 A | 7/1989 | Havel | | 5,552,780 A | 9/1996 | Knockeart .................. 340/991 |
| 4,845,745 A | 7/1989 | Havel | | 5,559,681 A | 9/1996 | Duarte |
| 4,857,801 A | 8/1989 | Farreii | | 5,561,346 A | 10/1996 | Byrne |
| 4,863,223 A | 9/1989 | Weissenbach et al. | | 5,565,855 A | 10/1996 | Knibbe |
| 4,874,320 A | 10/1989 | Freed et al. | | 5,575,459 A | 11/1996 | Anderson |
| 4,887,074 A | 12/1989 | Simon et al. | | 5,575,554 A | 11/1996 | Guritz |
| 4,922,154 A | 5/1990 | Cacoub | | 5,592,051 A | 1/1997 | Korkala |
| 4,934,852 A | 6/1990 | Havel | | 5,600,471 A * | 2/1997 | Hirohashi et al. .......... 398/136 |
| 4,962,687 A | 10/1990 | Belliveau et al. | | 5,621,282 A | 4/1997 | Haskell |
| 4,965,561 A | 10/1990 | Havel | | 5,633,629 A | 5/1997 | Hochstein |
| 4,969,146 A | 11/1990 | Twitty et al. | | 5,634,711 A | 6/1997 | Kennedy et al. |
| 4,973,835 A | 11/1990 | Kurosu et al. | | 5,640,061 A | 6/1997 | Bornhorst et al. |
| 4,979,081 A | 12/1990 | Leach et al. | | 5,642,129 A | 6/1997 | Zavracky et al. |
| 4,980,806 A | 12/1990 | Taylor et al. | | 5,673,059 A | 9/1997 | Zavracky et al. |
| 4,992,704 A * | 2/1991 | Stinson ....................... 315/312 | | 5,701,058 A | 12/1997 | Roth |
| 5,003,227 A | 3/1991 | Nilssen | | 5,712,650 A | 1/1998 | Barlow |
| 5,008,595 A | 4/1991 | Kazar | | 5,721,471 A | 2/1998 | Begemann et al. |
| 5,008,788 A | 4/1991 | Palinkas | | 5,734,590 A | 3/1998 | Tebbe |
| 5,010,459 A | 4/1991 | Taylor et al. | | 5,751,118 A | 5/1998 | Mortimer |
| 5,027,262 A | 6/1991 | Freed | | 5,752,766 A | 5/1998 | Bailey et al. |
| 5,034,807 A | 7/1991 | Von Kohorn | | 5,769,527 A * | 6/1998 | Taylor et al. ................. 362/85 |
| 5,036,248 A | 7/1991 | McEwan et al. | | 5,784,006 A | 7/1998 | Hochstein |
| 5,038,255 A | 8/1991 | Nishihashi et al. | | 5,803,579 A | 9/1998 | Turnbull et al. |
| 5,072,216 A | 12/1991 | Grange | | 5,808,689 A | 9/1998 | Small |

| | | |
|---|---|---|
| 5,821,695 A | 10/1998 | Vilanilam et al. |
| 5,836,676 A | 11/1998 | Ando et al. |
| 5,838,116 A | 11/1998 | Katyl et al. |
| 5,844,888 A | 12/1998 | Markkula, Jr. et al. |
| 5,848,837 A | 12/1998 | Gustafson |
| 5,850,126 A | 12/1998 | Kanbar |
| 5,851,063 A | 12/1998 | Doughty et al. |
| 5,852,658 A | 12/1998 | Knight et al. |
| RE36,030 E | 1/1999 | Nadeau |
| 5,859,508 A | 1/1999 | Ge et al. |
| 5,896,010 A | 4/1999 | Mikolajczak et al. |
| 5,912,653 A | 6/1999 | Fitch |
| 5,924,784 A | 7/1999 | Chliwnyj et al. |
| 5,946,209 A | 8/1999 | Eckel et al. |
| 5,952,680 A | 9/1999 | Strite |
| 5,959,547 A | 9/1999 | Tubel et al. |
| 5,963,185 A | 10/1999 | Havel |
| 5,974,553 A | 10/1999 | Gandar |
| 6,008,783 A | 12/1999 | Kitagawa et al. |
| 6,016,038 A | 1/2000 | Mueller et al. |
| 6,018,237 A | 1/2000 | Havel |
| 6,025,550 A | 2/2000 | Kato |
| 6,031,343 A | 2/2000 | Recknagel et al. |
| 6,037,721 A * | 3/2000 | Lansing et al. ............. 315/295 |
| 6,068,383 A | 5/2000 | Robertson et al. |
| 6,072,280 A | 6/2000 | Allen |
| 6,095,661 A | 8/2000 | Lebens et al. |
| 6,097,352 A | 8/2000 | Zavracky et al. |
| 6,132,072 A | 10/2000 | Turnbull et al. |
| 6,135,604 A | 10/2000 | Lin |
| 6,150,774 A | 11/2000 | Mueller et al. |
| 6,166,496 A | 12/2000 | Lys et al. |
| 6,183,086 B1 | 2/2001 | Neubert |
| 6,184,628 B1 | 2/2001 | Ruthenberg |
| 6,196,471 B1 | 3/2001 | Ruthenberg |
| 6,198,230 B1 | 3/2001 | Leeb et al. |
| 6,211,626 B1 | 4/2001 | Lys et al. |
| 6,215,409 B1 | 4/2001 | Blach |
| 6,250,774 B1 | 6/2001 | Begemann et al. |
| 6,273,338 B1 | 8/2001 | White |
| 6,292,901 B1 | 9/2001 | Lys et al. |
| 6,323,832 B1 | 11/2001 | Nishizawa et al. |
| 6,340,868 B1 | 1/2002 | Lys et al. |
| 6,374,079 B1 * | 4/2002 | Hsu ......................... 455/11.1 |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,624,597 B2 | 9/2003 | Dowling et al. |
| 6,717,376 B2 | 4/2004 | Lys |
| 6,720,745 B2 | 4/2004 | Lys |
| 2001/0033488 A1 | 10/2001 | Chliwnyl et al. |
| 2002/0038157 A1 | 3/2002 | Dowling et al. |
| 2002/0044066 A1 | 4/2002 | Dowling et al. |
| 2002/0047569 A1 | 4/2002 | Dowling et al. |
| 2002/0048169 A1 | 4/2002 | Dowling et al. |
| 2002/0057061 A1 | 5/2002 | Mueller et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0153851 A1 | 10/2002 | Dowling et al. |
| 2002/0158583 A1 | 10/2002 | Lys et al. |
| 2002/0163316 A1 | 11/2002 | Dowling et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176259 A1 | 11/2002 | Ducharme |
| 2002/0195975 A1 | 12/2002 | Dowling et al. |
| 2003/0011538 A1 | 1/2003 | Lys et al. |
| 2003/0028260 A1 | 2/2003 | Blackwell |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0100837 A1 | 5/2003 | Lys et al. |
| 2003/0133292 A1 | 7/2003 | Mueller et al. |
| 2003/0137258 A1 | 7/2003 | Piepgras et al. |
| 2003/0222587 A1 | 12/2003 | Dowling et al. |
| 2004/0032226 A1 | 2/2004 | Lys |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0113568 A1 | 6/2004 | Dowling et al. |
| 2004/0116039 A1 | 6/2004 | Mueller et al. |
| 2004/0130909 A1 | 7/2004 | Mueller et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0240890 A1 | 12/2004 | Lys et al. |
| 2004/0257007 A1 | 12/2004 | Lys et al. |
| 2006/0053447 A1 | 3/2006 | Krzyzanowski et al. |

FOREIGN PATENT DOCUMENTS

| | | |
|---|---|---|
| AU | 6 267 9 | 12/1996 |
| CA | 2 178 432 | 12/1996 |
| EP | 0495305 A2 | 7/1992 |
| EP | 0534710 B1 | 1/1996 |
| EP | 0752632 A2 | 1/1997 |
| EP | 0752632 A3 | 8/1997 |
| EP | 0823812 A2 | 2/1998 |
| EP | 0935234 A1 | 8/1999 |
| EP | 0942631 A2 | 9/1999 |
| EP | 1020352 A2 | 7/2000 |
| EP | 1113215 A2 | 7/2001 |
| FR | 2 640 791 | 6/1990 |
| FR | 88 17359 | 12/1998 |
| GB | 2045098 A | 10/1980 |
| GB | 2135536 A | 8/1984 |
| GB | 2176042 | 12/1986 |
| JP | 06043830 | 2/1994 |
| JP | 7-39120 | 7/1995 |
| JP | 8-106264 | 4/1996 |
| JP | 9 320766 | 12/1997 |
| WO | WO 89/05086 | 6/1989 |
| WO | WO 94/18809 | 8/1994 |
| WO | WO 95/13498 | 5/1995 |
| WO | WO 96/41098 | 12/1996 |
| WO | WO 02/061328 A1 | 8/2002 |
| WO | 2004/109956 | 12/2004 |

OTHER PUBLICATIONS

U.S. Appl. No. 90/007,452 by Dowling et al, filed Mar. 7, 2005.*
Yuichi Tanaka et al., "Indoor Visible Light Data Transmission System Utilizing White LED Lights," IEICE Trans. Commun., vol. E86-B, No. 8, Aug. 2003.
"LM117/LM317A/LM317 3-Terminal Adjustable Regulator", National Semiconductor Corporation, May 1997, pp. 1-20.
"DS96177 RS-485 / RS-422 Differential Bus Repeater", National Semiconductor Corporation, Feb. 1996, pp. 1-8.
"DS2003 / DA9667 / DS2004 High Current / Voltage Darlington Drivers", National Semiconductor Corporation, Dec. 1995, pp. 1-8.
"LM140A / LM140 / LM340A / LM7800C Series 3—Terminal Positive Regulators", National Semiconductor Corporation, Jan. 1995, pp. 1-14.

High End Systems, Inc., Trackspot User Manual, Aug. 1997, Excerpts (Cover, Title page, pp. ii through iii and 2-13 through 2-14).

Artistic License, AL4000 DMX512 Processors, Revision 3.4, Jun. 2000, Excerpts (Cover, pp. 7,92 through 102).

Artistic License, Miscellaneous Drawings (3 sheets) Jan. 12, 1995.

Artistic License, Miscellaneous Documents (2 sheets Feb. 1995 and Apr. 1996).

Nawnes's Dictionary of Electronics, Fourth Edition, S.W. Amos, et al., Preface to First Edition, pp. 278-279.

"http://www.luminus,cx/projects/chaser", (Nov. 13, 2000), pp. 1-16.

\* cited by examiner

*Primary Examiner*—Haissa Philogene
(74) *Attorney, Agent, or Firm*—Wolf, Greenfield & Sacks, P.C.

(57) ABSTRACT

The present invention relates to smart lighting devices bearing processors, and networks comprising smart lighting devices, capable of providing illumination, and detecting stimuli with sensors and/or sending signals. Sensors and emitters can, in some embodiments, be removed and added in a modular fashion. Smart lighting devices and smart lighting networks can be used for communication purposes, building automation, systems monitoring, and a variety of other functions.

80 Claims, 9 Drawing Sheets

UNIVERSAL LIGHTING NETWORK METHODS AND SYSTEMS

CROSS REREFERENCES TO RELATED APPLICATIONS

This application claims the benefit under 35 U.S.C. § 120 as a continuation (CON) of U.S. Ser. No. 09/663,969, filed Sep. 19, 2000, and entitled "Universal Lighting Network Methods and Systems," now U.S. Pat. No. 6,548,967.

Ser. No. 09/663,969 in turn claims the benefit under 35 U.S.C. § 120 as a continuation-in-part of Ser. No. 09/425,770, filed Oct. 22, 1999, entitled "Multicolored LED Lighting Method and Apparatus," now U.S. Pat. No. 6,150,774, which is a continuation of Ser. No. 08/920,156, filed Aug. 26, 1997, entitled "Multicolored LED Lighting Method and Apparatus," now U.S. Pat. No. 6,016,038.

Ser. No. 09/663,969 also claims the benefit under 35 U.S.C. § 120 as a continuation-in-part of the following non-provisional applications:

Ser. No. 09/215,624, filed Dec. 17, 1998, entitled "Smart Light Bulb", now U.S. Pat. No. 6,528,954;

Ser. No. 09/213,537 filed Dec. 17, 1998, entitled "Power Data Protocol," now U.S. Pat. No. 6,292,901;

Ser. No. 09/213,607, filed Dec. 17, 1998, entitled "Systems and Methods for Sensor-Responsive Illumination";

Ser. No. 09/213,189, filed Dec. 17, 1998, entitled "Precision Illumination," now U.S. Pat. No. 6,459,919;

Ser. No. 09/213,548, filed Dec. 17, 1998, entitled "Lighting Entertainment System," now U.S. Pat. No. 6,166,496;

Ser. No. 09/213,581, filed Dec. 17, 1998, entitled "Kinetic Illumination";

Ser. No. 09/213,659, filed Dec. 17, 1998, entitled "Illumination Components," now U.S. Pat. No. 6,211,626;

Ser. No. 09/213,540, filed Dec. 17, 1998, entitled "Data Delivery Track," now U.S. Pat. No. 6,720,745; and Ser. No. 09/333,739, filed Jun. 15, 1999, entitled "Diffuse Illumination Systems and Methods."

The present application also claims the benefit under 35 U.S.C. § 120 as a continuation-in-part (CIP) of the following U.S. applications:

Ser. No. 09/669,121, filed Sep. 25, 2000, entitled "Multicolored LED Lighting Method and Apparatus," now U.S. Pat. No. 6,806,659; and Ser. No. 09/971,367, filed Oct. 4, 2001, entitled "Multicolored LED Lighting Method and Apparatus," now U.S. Pat. No. 6,788,011.

Each of the foregoing applications is hereby incorporated herein by reference.

The present application also claims the benefit under 35 U.S.C. § 120 as a continuation-in-part (CIP) of Ser. No. 09/924,119, filed Aug. 7, 2001, entitled "Automatic Configuration Systems and Methods for Lighting and Other Applications," which in turn claims priority to provisional application Ser. No. 60/223,491, filed Aug. 7, 2000, entitled "Automatic Configuration Systems and Methods for Lighting and Other Applications."

Ser. No. 09/215,624, filed Dec. 17, 1998, entitled "Smart Light Bulb", now U.S. Pat. No. 6,528,954, claims priority to the following provisional applications:

Ser. No. 60/071,281, filed Dec. 17, 1997, entitled "Digitally Controlled Light Emitting Diodes Systems and Methods;"

Ser. No. 60/068,792, filed Dec. 24, 1997, entitled "Multi-Color Intelligent Lighting;"

Ser. No. 60/078,861, filed Mar. 20, 1998, entitled "Digital Lighting Systems;"

Ser. No. 60/079,285, filed Mar. 25, 1998, entitled "System and Method for Controlled Illumination;" and Ser. No. 60/090,920, filed Jun. 26, 1998, entitled "Methods for Software Driven Generation of Multiple Simultaneous High Speed Pulse Width Modulated Signals."

FIELD OF THE INVENTION

The present invention relates to computer networks and lighting systems. More particularly, the invention relates to devices, methods and systems for integrating illumination with data manipulation and transmission functions for lighting devices and network devices as well as methods for using the foregoing.

BACKGROUND

The advent of computer networks has provided users with a host of capabilities that were previously unavailable. Distributed users can communicate data using local area networks, wide area networks, and global networks, such as the Internet. Computer software programs running on computers at geographically remote locations can store, manipulate and retrieve data, including data sent from other locations. Thus, computer networks provide benefits of computing power without requiring a large computer at every point at which data is gathered, retrieved or displayed. For this reason, computer networks have become widespread in many commercial environments, such as corporate offices, factories, and the like. Computer networks are now installed in other locations as well, such as homes, retail environments, and the like. However, current computer network technology suffers a number of significant limitations that inhibit its use in nontraditional environments, such as retail store locations and homes.

A major problem with current computer network technology is the need for wiring. Most modern buildings are strung throughout with a plethora of wires and cords: computer cables, telephone wires, electrical lines, speakers, security systems, alarm systems, cable television and modems, and others. This complexity results in a variety of problems. During repairs, the appropriate set of wires must be sorted from each other. Frayed wires can short circuit and start fires, a problem compounded by the presence of multiple wire systems. New systems are frequently developed, often requiring a new wiring system. New wiring systems can be expensive to install in existing structures, because such systems are generally placed within the walls, and the installation is generally either invasive, requiring tearing up and patching walls, or complicated, with wires being gradually and gingerly eased throughout the maze of wires, pipes, and supports located behind the walls. Thus, computer networks that require significant wiring inhibit installation in environments where that wiring is difficult or unsightly (such as a retail environment) or where expertise is not available (such as in a typical home).

Another problem with current computer networks is that many of these systems are under control of a processor, such as a computer, or have the potential for such control. Most often, though, these systems are separate, with individual control systems. This separation also makes it more difficult and expensive to update existing systems, is either to install a control system, or to take advantage of an improved, modernized control system that becomes available. Although one system may include components that would be useful to another system, the systems often remain separate. Thus, there exists a need to bring these disparate systems under common control simplifying updating these systems, and potentially reducing the multiplicity of wires coursing through the walls, ceilings, and floors. Not only might a unified system be more efficient, but presently isolated systems could make use of components of other systems in a mutual fashion, providing significant overall benefit.

Another problem with current computer networks is that current wiring techniques inhibit installation of many devices at convenient locations. For example, wiring that comes through phone outlets is not typically suitable for placement of networked devices such as cameras, that require a line of sight to an item to be viewed from a remote location, without requiring significant additional wiring within the room in which the camera is located. Thus, a wiring scheme that provides more convenient locations for networked devices is desirable.

Although such universal systems have been considered, current proposals would require significant installation costs, such as adding new wires or changing existing wiring. Accordingly, a need continues for a universal device that can provide computer networking functionality at a wide variety of locations without requiring significant rewiring.

SUMMARY

The systems and methods described herein relate to lighting devices which include a lighting element and a microprocessor. The lighting element may include, in various embodiments, a light emitting semiconductor, such as a light emitting diode or other similar device, or any of a wide variety of other lighting elements. Use of the terms LED, or light emitting diode, herein, should be understood to encompass any light emitting semiconductor, except where the context precludes such an understanding. In embodiments, the devices further include one or more connections for attaching additional electronic components. In embodiments, the connections permit interchangeable use of modular components on a device. In certain embodiments, the lighting devices permit communication between the components and the microprocessor, e.g., to permit control of the lighting element based on input from sensor components, or facilitate electronic communication by mediating the transmission of signals to or from other devices. In certain embodiments, such communication is facilitated by utilizing a network of lighting devices. In certain embodiments, the lighting device is adapted to be interchangeable with a traditional lighting element, such as a halogen bulb, an Edison mount (screw-type) bulb, a fluorescent bulb, etc.

In another embodiment, a system according to the principles of the invention provides LEDs whose outputs can provide ordinary lighting while being modulated at high speed for wireless communication. In one embodiment, LED intensity can be controlled by controlling the duty cycle of a control signal, while a higher rate modulation scheme is used to encode independent data in the same control signal. When employing the LEDs for data communication, the invention, in one embodiment, utilizes wireless data transmission/reception with networking capabilities to permit the LEDs to communicate with several different devices within a network. These devices are fitted with signal receivers that can decode data in optical signals from the LEDs.

Provided herein are multifunctional lighting devices. The devices may include various element, such as a substrate carrying a plurality of electrical connections coupled to a power adapter, one or more lighting elements or elements, coupled to an electrical connection, for emitting light, one or more sensors for generating or modulating an electrical signal based on an external stimulus, and a processor, coupled to an electrical connection, for processing signals from the sensor.

The lighting elements can be light emitting semiconductors, LEDs, or other lighting elements. The processor can be a microprocessor. The sensor can be any sensor for sensing any environmental condition, ranging from any electromagnetic signals to acoustic signals to biological or chemical signals to other signals. Examples include an IR detector, a camera, a motion detector, an ozone detector, a carbon monoxide detector, other chemical detectors, a proximity detector, a photovoltaic sensor, a photoconductive sensor, a photodiode, a phototransistor, a photoemissive sensor, a photoelectromagnetic sensor, a microwave receiver, a UV sensor, a magnetic sensor, a magnetoresistive sensor, and a position sensor.

The sensors can be sensitive to temperature. For example, the sensor might be a thermocouple, a thermistor, a radiation pyrometer, a radiation thermometer, a fiber optic temperature sensor, a semiconductor temperature sensor, and a resistance temperature detector. The sensor might also be sensitive to sound, e.g., a microphone, a piezoelectric material, or an ultrasonic sensor. The sensor might be sensitive to vibrations, humidity, or concentration of a vapor, particulate or gas.

In embodiments, the device might include a data connection for coupling the processor to a data network, or a communication connection between the sensor and the processor for transmitting signals from the sensor to the processor.

Provided herein are also multifunctional lighting devices, which may include a substrate carrying a plurality of electrical connections coupled to a power adapter, a lighting element, coupled to an electrical connection, for emitting light, a signal unit for emitting a signal, and a processor, coupled to an electrical connection, for instructing the signal unit to emit a signal.

Provided herein are also methods for receiving data. The methods include various steps, such as providing a substrate carrying a plurality of electrical connections coupled to a power adapter, providing a lighting element coupled to an electrical connection, providing a sensor, providing a processor coupled to an electrical connection and to the sensor, receiving a stimulus with the sensor, and transmitting signals representative of the stimulus from the sensor to the processor. In embodiments, the method may include sending instructions to an actuator to alter the position of the lighting element.

Provided herein are also methods for transmitting data. The methods may include providing a substrate carrying a plurality of electrical connections coupled to a power adapter, a lighting element coupled to an electrical connection, a signal unit for emitting a signal, and a processor coupled to an electrical connection and to the signal unit, and transmitting signal instructions from the processor to the signal unit.

Provided herein are also methods for manufacturing a multifunctional lighting device, including various steps, such as providing a substrate carrying a plurality of electrical connections coupled to a power adapter, coupling a lighting element to an electrical connection, coupling a processor to an electrical connection, and coupling a sensor to an electrical connection and to the processor. The methods may include steps of coupling a sensor, such as coupling a sensor selected from an IR detector, a camera, a motion detector, a proximity detector, a photovoltaic sensor, a photoconductive sensor, a photodiode, a phototransistor, a photoemissive sensor, a photoelectromagnetic sensor, a microwave receiver, a UV sensor, a magnetic sensor, a magnetoresistive sensor, and a position sensor, or coupling a sensor selected from a thermocouple, a thermistor, a radiation pyrometer, a radiation thermometer, a fiber optic temperature sensor, a semiconductor temperature sensor, and a resistance temperature detector. Coupling a sensor may include coupling a sensor that is sensitive to sound.

Methods for manufacturing a multifunctional lighting device provided herein may also include providing a substrate carrying a plurality of electrical connections coupled to a power adapter, coupling a lighting element to an electrical connection, coupling a processor to an electrical connection, and coupling a signal unit to an electrical connection and to the processor.

Provided herein are methods for manufacturing a multifunctional lighting device, comprising providing a substrate carrying a plurality of electrical connections coupled to a power adapter, coupling a lighting element to an electrical connection, coupling an actuator to an electrical connection, and coupling a processor to an electrical connection and to the actuator.

Provided herein are also methods for building a network of multifunctional lighting devices, comprising disposing a plurality of lighting devices according to the present disclosure in an arrangement, and establishing communication links between each lighting device and the other lighting devices.

Provided herein are various methods of doing business, which include providing a retail environment, lighting the retail environment with a lighting system, the lighting system including a lighting element and a microprocessor, sensing a condition of the retail environment, and adjusting the lighting of the retail environment to reflect the sensed condition. The sensed condition may be the proximity of a customer to a retail item and wherein the lighting condition is adjusted to provide increased illumination to the retail item. The sensed condition may be entry of a customer into the front of a store, and wherein the lighting condition is adjusted to encourage entry of the customer further into the store. The lighting condition may be a moving rainbow effect.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way. The invention will be appreciated more fully from the following further description thereof, with reference to the accompanying drawings, wherein.

DETAILED DESCRIPTION

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

Figure 1:
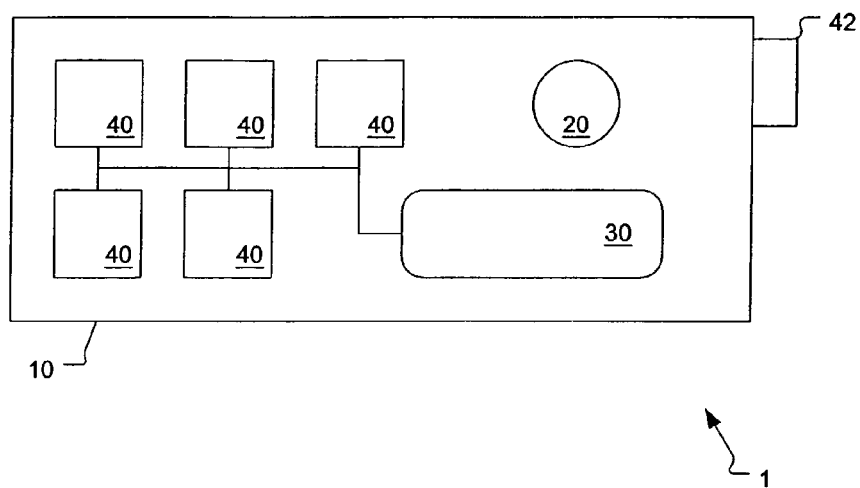
FIG. 1 depicts a smart lighting device as described herein.

The systems and methods described herein relate to electronic devices such as the device 1 of FIG. 1, referred to herein as smart lighting devices, which include a substrate 10 carrying a lighting element 20 and a processor 30, as well as a plurality of connections 40 for the attachment of additional electronic components, such as sensors, emitters, and actuators. The lighting element 20 may also be coupled to the processor 30, to permit variation of the emitted light as a function of input from a sensor, or a predetermined program executed by the processor 30, particularly when LED lighting elements are employed.

The lighting element 20 may be an incandescent, halogen, LED, fluorescent, or other lighting element capable of emitting sufficient light to illuminate an area, such as an amount of light similar to at least a 25W incandescent light bulb. LED lighting elements are particularly well suited for such networks, because they can be configured to be responsive to electronic signals, including digital data protocols such as DMX. Additionally, the voltage, current, and control used to operate LED lighting elements can be adapted to more closely resemble those used for conventional electronic and/or digital devices (See U.S. patent application Nos. 09/215,624, 09/213,537, 09/213,607, 09/213,189, 09/213,548, 09/213,581, 09/213,659, 09/213,540, as well as U.S. Pat. No. 6,016,038). Other lighting elements such as incandescent lighting elements may also be controlled to provide, for example, dimming.

The lighting element 20 may also include any system that is capable of receiving an electrical signal and producing a color of light in response to the signal. Thus, the lighting element 20 may include light emitting diodes of all types, light emitting polymers, semiconductor dies that produce light in response to current, organic LEDs, electro-luminescent strips, and other such systems. In an embodiment, the lighting element 20 may refer to a single light emitting diode having multiple semiconductor dies that are individually controlled. The lighting element 20 may include any type of light-emitting semiconductor, including organic LED's, light-emitting plastics, and so forth.

The lighting element 20 may also, or instead, include any other illumination source including any LED system, as well as incandescent sources, including filament lamps, pyro-luminescent sources, such as flames, candle-luminescent sources, such as gas mantles and carbon arch radiation sources, as well as photo-luminescent sources, including gaseous discharges, flourescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kineluminescent sources, thermo-luminescent sources, triboluminescent sources, sonoluminescent sources, and radioluminescent sources. Illumination sources may also include luminescent polymers capable of producing primary colors.

The processor 30 may be any data processing device, such as a microprocessor. The connections 40 may include power connections to provide electricity or other energy to the electronic components and/or a data connection to the processor 30 for communication between the processor 30 and a component coupled to the connection 40. In certain embodiments, data and power may be transmitted simultaneously over the same connections, e.g., using pulse-width modulation protocols, other carrier wave protocols, or the like. In certain embodiments, the smart lighting device 1 includes a power adapter 42 for connection to a power source. The power adapter 42 may be adapted for connection to a power source through a conventional lighting jack, e.g., a halogen, fluorescent, or Edison-mount (screw-type) fixture.

In certain embodiments, the connections 40 permit modular reconfiguration of interchangeable sensor and emitter components, so that the various input and output types of the smart lighting device 1 may be varied to accommodate changing needs and situations. Examples of components which may be used as sensors include sensors sensitive to electromagnetic signals (e.g., cameras, motion detectors, proximity detectors, photovoltaic sensors, LTV sensors, photoconductive sensors, photodiodes, phototransistors, photoemissive sensors, photoelectric sensors, electromagnetic sensors, microwave receivers, magnetic sensors, magnetoresistive sensors, position sensors, etc.), sensors sensitive to temperature (e.g., thermocouples, thermistors, radiation pyrometers, radiation thermometers, fiber optic temperature sensors, semiconductor temperature sensors, resistance temperature detectors, etc.), sensors sensitive to sound (e.g., microphones, piezoelectric materials, ultrasonic sensors, etc.), sensors sensitive to vibrations, humidity, chemicals (such as concentration of a vapor or gas), or any other type of sensing device capable of generating a detectable signal in response to a stimulus. Examples of components which may be used as emitters include those which emit electromagnetic radiation (such as infrared, microwave, radio, or other types of signals), acoustic signals (such as speakers, ultrasonic emitters, or other devices which emit sound waves), or other devices which emit signals, especially communication signals. Actuators capable of generating a force in response to an electronic signal may also be coupled to a smart lighting device 1, e.g., to alter the position of the smart lighting device 1, or to effect another physical change in the vicinity of the smart lighting device 1. Any combination of sensors, actuators, and emitters may be coupled to connections 40 on a smart lighting device 1, and may communicate with the processor 30, e.g., to generate or alter an output from the lighting element 20, an emitter, and/or an actuator in response to a stimulus detected by a sensor, such as in combination with instructions carried out by the processor 30.

Figure 2:
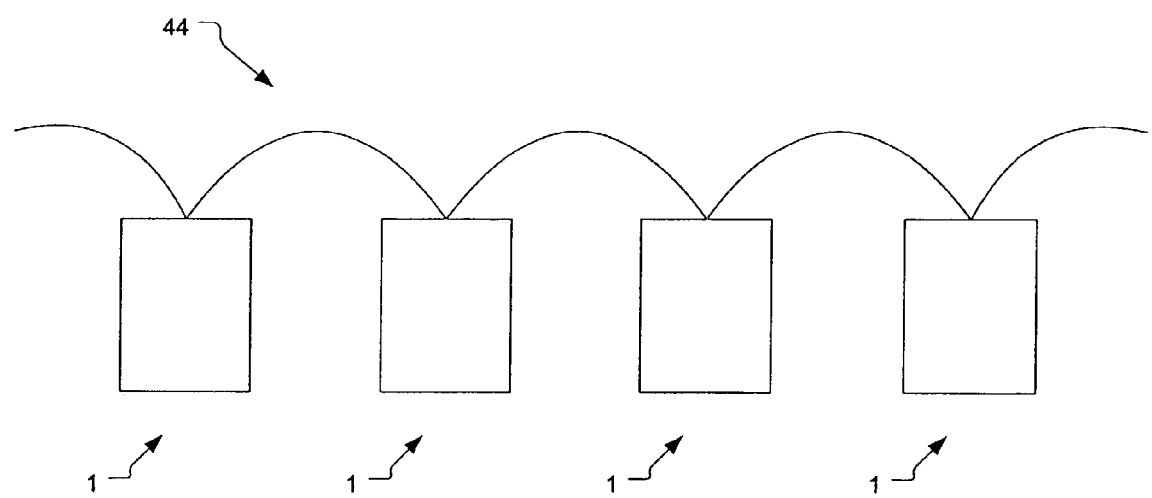
FIG. 2 depicts a smart lighting network comprising a plurality of smart lighting devices as described herein.

A plurality of smart lighting devices 1 may be coupled together to form networks 44, as shown in FIG. 2. Data may be transmitted between smart lighting devices 1 over any physical medium, including a twisted pair, coaxial cables, fiber optics, or a wireless link using, for example, infrared, microwave, or radio frequency transmissions. Any suitable data networking protocol may be used for data transmission, including TCP/IP, variations of Ethernet, Universal Serial Bus ("USB"), Bluetooth, Firewire, DMX, a token ring, a token bus, serial bus, or any other suitable wireless or wired protocol. The network 44 may also use combinations of these physical media and data protocols, and may include links using known networks such as the Internet and the Public Switched Telephone Network ("PSTN"). Techniques and systems such as those set forth in U.S. Pat. Nos. 5,844,888, 5,113,498, and 4,969,146 can be adapted for use in the lighting networks described herein. Thus, for example, lighting fixtures in a building may be fitted with smart lighting devices 1 as described herein. Smart lighting devices 1 situated in ceiling fixtures, for example, may be wired into a central network, and may communicate with lighting devices in lamps, for example, using infrared transmissions. Commands could be sent to the central network of smart lighting elements over the Internet from a remote location.

Smart lighting elements may be employed for any of a variety of diverse functions. The following examples are exemplary uses, possible in a building, such as a home or office, wherein, for example, overhead light fixtures comprise smart lighting elements as described herein. Additionally or alternatively, smart lighting elements may be employed in displays, in lighted floors or wall panels, cove lighting, or in any other desired configuration. Other configurations and applications of smart lighting elements capable of the functions below or other functions are considered to fall within the compass of the present invention.

In one embodiment, a smart lighting network may be used to facilitate mobile communications technology. Cellular telephones, wireless data transmitters (such as Apple Computer's AirPort technology), and other mobile communication devices commonly require high-energy transmissions or proximal receivers in order to connect with a suitable network. In a building outfitted with a smart lighting network connected, for example, to the Internet or to a telephone network, each room may be configured with a smart lighting device including an infrared, radio frequency, microwave, or other suitable transceiver. Using traffic management techniques such as those currently employed in dense networks or mobile telephone communications, for example, one or more cordless telephones can be made to function throughout a building using low-power signals, thereby lessening the demand for battery power. This technique may also be employed with wireless telephones, and has particular application with, for example, third generation wireless telephony solutions that permit micro-cells within a cellular infrastructure. Using such an approach, a micro-cell may be created inside a building, with connections established through the smart lighting network to an external wireless network, or directly to the PSTN. Such an approach may conserve wireless device energy that would otherwise be required to transmit signals through building walls to an external cellular/wireless base station.

Similarly, a portable computer can remain connected to the Internet or other data network while being transported throughout a building. Signals from remote controls, e.g., for a television or stereo system, can be received in one room, transported over the smart lighting network, and transmitted to a room containing the corresponding component (or over the entire network) to increase the range of remote control, and permit for example, control of a stereo system from any room in a house. Even in situations where movement does not occur, such a network may reduce the number of cords and wires required to maintain connections, potentially liberating and simplifying common communication systems. For example, a desk may be located in any corner of an office without regard to the positions of data or telephone jacks. Computer components may communicate through space rather than over wires, making it possible for components such as monitors, computers, printers, etc. to be situated in configurations or relocated in ways that are difficult or impossible using wire connections. For example, a printer could be moved to different room of an office building without rewiring to create a connection, even while data was being transmitted from a computer to the printer. Thus, the methods and systems disclosed herein can offer a wireless alternative to structured wiring for a variety of functions.

In another embodiment, a smart lighting network may be used to deliver audiovisual stimuli. For example, the network may include devices that have or incorporate speakers and processor-controlled lighting elements. When a user initiates playback of a recorded audio or audiovisual program, or receives an audio or audiovisual transmission, such as a radio or television broadcast, the smart lighting network may reproduce the audio portion of the transmission or recording. Surround Sound technology, or other spatial audio imaging techniques, can be used to create multichannel surround sound effects, and may be mediated by a central controller or through the individual processors of the smart lighting devices. Remote components may communicate through the smart lighting network. For example, satellite speakers of a Surround Sound system can receive audio signals wirelessly through the smart lighting network. If the program includes a lighting track, containing instructions for ambient lighting conditions complementary to the traditional audiovisual data, the lighting elements of the smart lighting network may be used to create lighting effects coordinated with the traditional audiovisual program. For example, effects such as lightning, sunsets, fiery red glows, or other effects that can be generated by modulating the color and/or brightness of ambient lighting can be used to enhance the effect of a traditional television or movie experience, for example. Similarly, audio feed, such as music or intercom applications, can be broadcast over an entire smart lighting network, or directed to a particular smart lighting element within the network, without requiring a separate system wired throughout a building. Conversely, a preexisting lighting, intercom, or speaker system can be modified or adapted to provide a smart lighting system without requiring extensive rewiring or invasive renovation.

Similar smart lighting networks could be used in a theater, music hall, auditorium, or other performance arena. For example, a stage could be provided with a smart lighting network including lighting elements, microphones, and sensors, e.g., for tracking the motion of performers, actors, etc. With such a system, for example, the smart lighting network could be programmed with a lighting sequence designed for a particular play, opera, musical, or other theatrical event. The network could monitor the progress of the event, e.g., by tracking the location and/or movement of the actors, etc., and effect lighting changes, e.g., between scenes, or to provide effects, such as lightning, deepening dusk, sunrise, power outages (including brownout and momentary flickers), programmed to coincide with staged events. Moreover, such a lighting system could include smart lighting elements disposed in a seating area, e.g., over an audience. These lighting elements could include microphones, for reproducing sound from a stage or production area, including prerecorded sound effects. Such prerecorded sound effects, including thunder, car horns, telephone rings, tire skids, barking dogs, etc., like the lighting effects discussed above, can also be triggered by sensor input from smart lighting elements over a stage in accord with a program designed for the event. Additionally, lighting elements in a seating area can reproduce on-stage lighting effects throughout the entire audience, to mimic, for example, the flickering glow of a fire, a Rash of lightning, daybreak, or any other lighting effect.

By including microphones and speakers in the smart lighting network, communication can be instituted without a need for separate telephone devices. For example, a smart lighting device can operate as a voice-activated telephone, dialing numbers or contacting parties by voice commands. The communicating party is thus liberated from hand-held telephone devices, and a larger area and larger number of participants may be served by a smart lighting network than may generally be served by, for example, a speaker-phone. Furthermore, cameras may be included in the smart lighting network, enabling videophone applications. In certain embodiments, a smart lighting system can be configured to respond to a voice by activating a camera in the nearest smart lighting device and, optionally, pointing the camera at the speaker using an actuator. A smart lighting network can be configured to pinpoint the location of a speaker or other audio input by triangulation or other means. The methods and systems disclosed herein can be further used by such methods as an indoor positioning system for objects.

Smart lighting devices can be equipped with light sensors appropriately positioned to detect ambient light and modify the output of the lighting element to achieve a predetermined brightness or hue. Such networks may be particularly appropriate in sensitive environments such as operating rooms, photography studios, or agricultural operations. In agricultural environments, the smart lighting devices may Is include sensors, such as humidity or temperature sensors, to permit responsive control and maintenance of optimal growing conditions by regulating lighting as well as other systems, such as computer-controlled humidification, heating, irrigation or watering systems.

Smart lighting devices may be equipped with chemical sensors, e.g., for detecting smoke, carbon monoxide, radon, gas leaks, etc., to provide an integrated sensor/alarm system in a home, business, or vehicle. Vibration sensors can be used for earthquake monitoring. Proximity and/or motion detectors can be used for security systems, optionally in conjunction with camera components. Such networks can also be used for child monitoring, e.g., with a microphone and/or camera operating in a baby's room and transmitting data to another room, or over a networks such as the Internet. Speakers and/or lights can be used to generate alarms or warning signals when designated stimuli are detected. Access to such a smart lighting network over a larger network, such as the Internet, can allow a security company to control lighting and other functions of a building from a remote location to deter burglary more effectively than simple light timers, and can similarly permit remote video monitoring for security purposes, or to distinguish false alarms from actual threats.

Additional data collection and monitoring functions can be achieved with smart lighting networks. For example, smart lighting elements may be placed in public spaces, such as retail stores, convention halls, public streets, sports venues, entertainment spots, etc., to monitor the flow of people, vehicles, or other objects. A smart lighting element may, for example, determine the number of people or objects which pass by the unit, the speed at which the people or objects pass the unit, or any other suitable measurement. The collected data may then be analyzed, e.g., using a processor connected to the smart lighting network, or by downloading the collected information to a suitable processor, etc., to determine traffic flow, traffic patterns, points of congestion, etc. This analysis may be useful, for example, to determine points where traffic is congested, to help identify a change in the layout or configuration that may help redirect traffic flow or ease passage and congestion, or to determine, for example, how customers prefer to navigate through a supermarket or find seats in a theater.

In a retail or entertainment environment, such as a department store, park, resort, or casino, such data may also be useful to identify customer reactions to displays. For example, a smart lighting element in a display, or a smart lighting network in a retail environment, may collect information such as how long customers view a display on average, whether a display attracts people from distant parts of a store, or even capture or analyze features such as facial expressions, to gauge customer's interest in and reaction to a retail display, advertisement, or other display meant to attract attention. Such information may further be correlated with information such as sales data, e.g., collected at checkout lines, cash registers, or other inventory systems, to determine the overall effectiveness of retail displays and advertisements. By reviewing and analyzing such data, retailers and marketers can more accurately gauge what types of displays, what locations, and what combinations of items are preferred by customers, are engaging, and are most effective at inducing increased sales. Such information can also be used to distribute high-interest items throughout a store to achieve even traffic flows, or to increase customer exposure to new or obscure types of merchandise, or items that are typically bought on impulse.

Various tracking functions can be easily achieved with smart lighting networks. For example, an object in the range of a sensor of a smart lighting element, e.g., a camera, microphone, motion detector, etc., can be identified by the unit or network as an object. As the object passes out of range, the network can track the motion of the object, determine where the object is going, identify the smart lighting element associated with that location, and track the object as it moves into the range of the second smart lighting element, e.g., by a hand-off technique or other protocol.

A variety of entertainment uses are possible for smart lighting networks. For example, theater or other lighting systems can be rapidly set up in outdoor environments, or in indoor environments not wired for complex lighting systems. Appropriate smart lighting devices may, for example, be situated near electrical outlets and, rather than being wired together, may be controlled by wireless commands. Such a network may also function as a sound system by incorporating speakers in the smart lighting elements. Modular networks which function using minimal wiring facilitate set-up for travelling performances, or in environments, such as a high school gym, a stone church, a tent, outdoor gatherings, fountains or other water displays, etc., where complex wiring arrangements may be unsightly, dangerous, or difficult to set up. The combination of light and audio functions further simplifies and shortens required set-up procedures. Furthermore, smart lighting devices can be outfitted with sensors, such as microphones or proximity detectors that can be used to interactively modulate audio-visual output, for example, in response to proximity of dancers or spectators, in response to tempo or dynamics of music, etc. Responsive and interactive smart lighting devices can also be used in a fun house or other interactive environments for entertainment purposes.

A smart lighting network may be controlled by a centralized system, or cooperatively through the collective microprocessors of the smart lighting network. Appliances and other household, business, industrial, or other devices can be outfitted for remote control, e.g., through infrared, microwave, or radio signals, and subjected to control by the centralized system using the smart lighting network. Such systems can be used to automate building systems functions and electrical devices, e.g., without requiring extensive or particularized rewiring. Uses can be as diverse as starting a coffee machine, booting up a computer, raising the thermostat, starting and warming up a car at a specified time, or continuously controlling the major functions of a processing plant. Including sensors in the system enables more complex, interactive functions, such as turning on a light when a person enters a room and turning it off when the room is empty. Individuals can be equipped with badges that transmit signals based on identity or a general classification scheme, thus permitting the system to moderate access control to various sites of a building, play music in a room that matches the predetermined preference of its occupant, monitor activity and locations of a building's occupants, and perform other functions. Voice commands can be received, interpreted, and carried out at distant locations in the building, optionally depending on the status of the issuer of the command, as determined, for example, by an identifying badge, voice or face recognition, etc. Because the network can be accessed over a telecommunications network such as the Internet or the public phone network, the environment of a smart lighting network can be monitored and/or modified from a remote location. For example, business operations, home security, and other conditions may be verified by receiving output from sensors in the smart lighting network at a terminal in a remote location, e.g., using a web browser or other suitable interface. Commands can be sent from a remote location as well, permitting modulation of any functions, such as building temperature, lighting control, appliance or machine operation, etc., which is subject to control or mediation by the smart lighting network.

Additionally, one of skill in the art will appreciate that a smart lighting network may comprise smart lighting elements and smart units that do not include lighting elements, but include other functionality, such as sensors, transmitters, indicators, speakers, or the like, e.g., to gather or transmit information in environments where lighting is not necessary or desirable, although network connectivity is desired.

The following description will be understood by one of skill in the art as exemplifying various embodiments of the present invention without in any way limiting the scope or nature of the invention. As may be clear from the following, a digital lighting system of smart lighting elements may operate as a platform to support the collection, exchange, and interpretation of sensor information available throughout a network, and to support application of the sensor information to control and modify the environment.

A digital lighting network may be usefully employed in retail environments. Fundamentally, retail stores and chains try to attract people and cause them to spend more money on their products and services. Human observers are typically employed to observe shoppers, from which observations trends, responses, and other valuable information may be extracted. A smart lighting network augmented with sensing devices could provide the same observation capability and automatically produce detailed reports of shoppers. The resulting information, which may continuously monitor an entire store, can be used to reveal traffic flow, provide feedback on merchandising, analyze product placement trials, assess the effects of placement, lighting, merchandising, graphics, store fixtures and so on. This knowledge, normally not easily captured, is invaluable to a store or chain owner.

Even more far-reaching than simply tracking and providing data collection is the potential of instantaneous feedback to user actions. Thus retailers may receive instantaneous, or near-instantaneous data on shopper responses to various displays and merchandise placements. This information may be used to create dynamic displays, either subtle or pronounced, such as changing display lighting in response to a shopper pausing in front of a display, or activating a sound track. Real-time shopping information may also be used to more closely control inventory, track sales trends, and the like.

Supermarkets and other retailers with thin margins may advantageously employ a digital lighting network to provide good traffic flow and easy access to goods, and to more accurately price shelf space for suppliers and wholesalers. Suppliers and wholesalers, who may already pay for shelf space and location, would find tracking information very useful in assessing how people move within a store. Stores with smart lighting networks could offer such information to the wholesale giants at a fee, benefiting the stores, the suppliers, and the customers.

Information collected in a retail application may be presented at a central location, such as a computer, and may include software for controlling various outputs within the digital lighting network, such as sound systems, lights, and other devices.

A digital lighting network of smart lighting elements may be usefully employed in a security system. Many public buildings, building lobbies, stairwells, elevators, convenience stores, bank ATMs, and many streets have cameras observing people going about their business. In the same way that portals and web sites provide click-tracking of users, such tracking functions can be extended to the physical world using smart lighting networks, so that brick-and-mortar systems can track behaviors and actions of people as well.

For high-crime areas, smart lighting networks may be used for the tracking of vehicles and people to help capture criminals either in the act or afterwards. Smart lighting elements can hand off information so that tracking becomes a matter of establishing continuity of data and information between multiple units of the network. For example, a car is labeled as an object within a field-of-view and then, having moved on, is handed off as an object to an adjacent node. This technique establishes continuity and consistency for automating the tracking process, as though the area were covered by one large camera.

These and other scenarios incorporating proximity, chemical sensing, smoke, and fire detectors are facilitated by the ability to adapt and alter the functionality of a smart lighting element in a modular fashion. Security systems can then be quickly tailored to changing conditions.

A digital lighting network of smart lighting elements may be usefully employed in an office or other commercial location. Smart lighting networks which employ wireless technology can be easily expanded or adapted as a company grows or changes in size and may be provided as an alternative, or an enhancement, to wireless local area networking in a commercial setting. Local wireless will enable network access throughout a building or corporate campus and the ability to transfer and access information will be greatly facilitated.

A digital lighting network of smart lighting elements may be usefully employed in theme parks, resorts, hotels, casinos, and entertainment companies, all of which require careful and constant tracking of customers. With a smart lighting network, key areas that people avoid or are attracted to can be quickly identified.

Large events including trade shows can utilize smart lighting networks to determine traffic flow, interest, dwell time, and interaction at individual booths or across whole sections of a trade show floor. Theatres, which obviously track ticket sales, can get more information about how people move in and out of theatres, where people prefer to sit and move, how concession stands provide access and sales, etc. by using smart lighting networks. Large cinemas constantly deal with scheduling and crowd control issues, and smart lighting networks can be used to diagnose and monitor problems, as well as assess the effectiveness of solutions.

In some embodiments, the hardware and network of the digital lighting network may employ readily available and standardized technologies as modular components of smart lighting elements. Installation costs can be reduced through the use of existing power wiring and the use of emerging wireless standards such as the 802.11 wireless LAN standard, Bluetooth, or standards from the Infrared Data Association ("IrDA").

In an embodiment, the smart lighting elements are fully modular. Each smart lighting element is a modular I/O and networking device that may be seamlessly added or removed from a digital lighting network. Use of an open architecture may permit the use and development of a wide variety of different smart lighting elements and other compatible devices for different applications. The framework may include, for each smart lighting element or other device (collectively "modules"), power and a conduit to wired networks and a minimum set of I/O features. Both elements can be designed to make it simple and effective to add or change modules depending on desired feature sets.

The modules may be controlled by software that enables generic data collection and actions that are point-and-click based, such as a browser interface, as well as more detailed functional descriptions and controls for specific modules known to the software. For example, the software may include a graphic interface that displays the information generated by one or more modules, and may permit control of light intensity or color for modules known to be smart lighting elements.

A map may provide an intuitive graphical user interface for displaying a room or area. For example, a store map can be displayed and modules may be placed within the map using drag-and-drop operations. Modules may then be double-clicked to open a configuration window or menu, and, if the configuration is on-line, the module can be queried for functionality. This may open a different window or frame that lists the features and the results of a self-test. If the functionality or type of a module is known a priori, this may be entered directly into the configuration window, or selected as an item for drag-and-drop on to the area map. Since modules may include output devices (such as speakers, lights, moving systems), programs or effects can be written or developed through the control software, or independently, and incorporated into the module over the digital lighting network.

Such smart lighting networks make it possible to link data and action. The graphical user interface may include tools for creating process flows. For example, through a simple block diagram or state diagram approach, various processes may be graphically described, including implementations of deterministic processes, event-driven processes and conditional logic. For example, when someone enters a room a lighting sequence may be triggered, or a single 'presentation' switch may cause multiple actions to occur.

A digital lighting network may be usefully employed as a data acquisition tool. Data gathering may be automated for monitoring traffic flow through hallways, open areas, elevators, as well as entrances and exits, and the traffic flow may be correlated to time, place, or other factors.

An example application in a retail environment is now described in detail. A clothing chain that markets to teenage girls in malls throughout the northeast US can install modules with a variety of sensor devices including cameras and proximity detectors and digital lighting. The modules can each be installed with only a single power connection, and one of the modules can also be tied into the store's data network which uses a telephone line for data communications with the store's headquarters. The system may further be connected to the point-of-sale data collection system to permit exchange and integration of captured data.

After opening the store in the morning, the store manager can go to the monitor screen and look for any activity on the digital network during the night. The system might inform her that the cleaning crew was in. However, the system might also alert her that the air conditioning failed during the night and the temperature sensors detected a dramatic rise in temperature between 3 and 4 am. Although with clothing this might not be a concern, some of the cosmetics in the store might be badly affected by elevated temperatures.

As customers move throughout the store during the day, their general movements may be tracked. Later, a map can be generated from the day's data collection to display people traffic and dwell time at various points in the store. The information can make it apparent, for example, that an aisle of shirts and accessories is the least visited area of the store. Although the aisle may be easily accessible, the manager might investigate and discover a rack of clothes has unintentionally obscured the aisle from view as customers approach that area.

The day's receipts may also uncover a curious anomaly: the clustering of data, which can be used to draw inferences about buying habits, may show that girls who are buying smaller size pants and skirts are also buying much larger shirts that don't correspond to the pants size. The manager might move those items closer together in the store to see if this generates increased sales and traffic in that area.

A quick tracking analysis might reveal that people are not stopping by displays at the entrance but are sweeping through the entrance quickly into the store, which might prompt moving the entrance displays further into the store or jazzing up the entrance displays. Traffic near an aisle of blouses might be identified as being normal even when sales are much lower than normal. The information might indicate that if two or more people are in that area, then one or both moved quickly through. After investigating, the manager might find that the cases have been moved closer together than would be comfortable for two people and then move the displays away from each other.

Several suppliers of clothing might purchase data from several stores for analysis. They might examine trends in traffic and their own product positioning through the store. Better placement may result in better sales. The modules may thus facilitate measuring effectiveness of display areas.

A customer may enter and see a product display board which depicts representative pieces of clothing: pants, skirts, blouses, shirts, lingerie, etc. As the customer touches a piece of clothing, a smooth but quick series of lights may trace a path on the ceiling of the store indicating where that type of item is displayed. The lights may culminate in a single indicator light above the clothing indicated. The customer may then move to the indicated location to see a display of sweaters.

Price changes may be transmitted dynamically through the smart lighting network. For example, where a customer spends a significant amount of time in front of a display, the price for a product may be lowered to lure the customer to make a purchase. Further, the price for a customer may be personalized by tracking the customer to a cash register and providing the customer with a price displayed when the customer selected the item. Alternatively, pricing may be increased if, for example, fifty percent of the inventory is sold in a single morning. More complex pricing schemes may also be implemented, and may be personalized to individual customers according to their observed shopping habits.

In a retail environment such as that described above, where information concerning products, product sales, customers, inventory, pricing, and the like may be proprietary and highly valuable to a store owner or manager, it may be desirable to add security to the smart lighting network. Secure transmissions may be implemented using a number of cryptographic techniques or other techniques, and may be implemented, for example, as a physical layer, network layer, or application layer encryption system, depending upon the complexity and processing power of each smart lighting network node. Further, security may be negotiated individually for each communication link, or each smart lighting element may have its own encryption key, or a single key may be provided for an entire smart lighting network.

An application of the digital lighting system with smart lighting elements to an arena environment is now described in detail. A sports arena may host hockey and basketball games and other sporting events as well as rock concerts. The events may have very different types of crowds that may behave differently. For security, the existing CCTV camera systems may have been adequate, but did not help track the flow of people before, during, and after the events. Modules, however, may facilitate tracking people during events. For example, the smart lighting network may provide a detailed map of traffic flow that enables simple reconfiguration and redesign of the exits and entrances. Additionally, the system may also be able to identify several configurations of concessions and restrooms that caused substantial bottlenecks during certain events. By closing some concessions and opening others the problems may be reduced or eliminated.

Moreover, during some rock concerts, roving bands of fans might cause considerable damage and harm to others. The tracking features and sensing devices of the smart lighting network might pinpoint and follow the perpetrators, enabling security officers to intercept, with plenty of time to plan and implement the interception.

In certain embodiments of the invention, modulation of the LEDs of the smart lighting devices disclosed herein can provide communications functions between smart lighting devices or between a smart lighting device and another networked device.

The recent development of general illumination fixtures based on LEDs includes the use of lighting that employs a mix of fixed-wavelength LEDs, such as monochromatic red, green, or blue LED's, to produce a spectrum of colors. Such LED systems are disclosed in U.S. application Ser. No. 09/215,624, filed Dec. 17, 1998, which application is incorporated herein by reference. Generally, the LEDs in these systems are configured as saturation devices, that is, they have a single, "on" intensity determined by a regulated current. The perceived intensity of LEDs in these systems is controlled by rapidly turning the LEDs on and off with a control signal that has a regulated duty cycle. While the period of the control signal is sufficiently short that a human eye cannot detect the progression of "on" and "off" states, there remains significant additional switching speed in conventional LEDs.

In wireless communication, a data signal is modulated onto a carrier signal such as a radio frequency, visible light (laser), or infrared carrier, with an appropriate modulation scheme selected according to the transmission medium. While infrared LEDs have been used for wireless data transmission, typically using pulse code modulation ("PCM"), and visible light LEDs have been used for illumination. In the illumination field, LEDs provide significant design flexibility since LEDs with different wavelengths, i.e., colors, may be mixed to generate desired lighting effects and desired colors. As a significant disadvantage, systems of LEDs, and more particularly visible light LEDs, require additional, independent data communication hardware in order to operate as a networked lighting system. This may include twisted pair wire leads, or some other bus structure, which must physically interconnect one or more control units to hg4ting subsystems that are to be controlled.

In this embodiment, an LED system is provided that employs pulse-width modulation ("PWM") to control illumination intensity and pulse code modulation ("PCM") to carry data. However, it will be understood by those of ordinary skill in the art that the methods and systems described herein can be suitably adapted to many other modulation schemes suitable to LEDs, and may further be used in combination with many known data networking techniques. The principles of the invention are particularly applicable to any environment where the dual functions of illumination and wireless data communication are desired.

Figure 3:
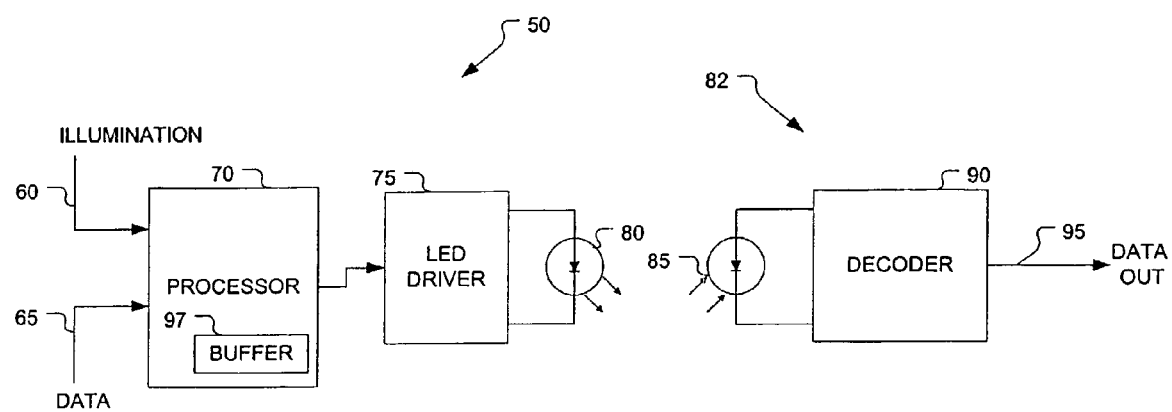
FIG. 3 shows an LED encoder and an LED decoder according to the principles of the invention.

FIG. 3 shows an LED encoder and an LED decoder according to the principles of the invention. It will be appreciated that numerous LEDs and decoders may be used in combination, as will be discussed in more detail below. The single LED system includes a transmitter 50 comprising an illumination signal input 60, a data input 65, a processor 70, an LED driver 75, and an LED 80. The system further includes a receiver 82 comprising an optical transducer 85, a decoder 90, and a data output 95.

In conventional LED systems, the illumination signal applied to the illumination signal input 60 is converted to a pulse width modulated ("PWM") signal that is provided as a control signal to the LED driver 75. The perceived intensity of the LED 80 is a function of the duty cycle, or average "on" time, of the control signal. According to the principles of the invention, this control signal may be further modulated by a data signal applied to the data input 65, while retaining the duty cycle of the control signal such that the intensity of the LED 80 is still controlled by the illumination signal. The processor 70 may include a buffer 97, which stores data received at the data input 65 when a received data rate exceeds a data capacity of the control signal.

It will be appreciated that numerous devices for receiving, processing, and generating signals are known and may be employed with the invention. The processor 70 or decoder 90 may be a microprocessor, microcontroller, programmable digital signal processor, application-specific integrated circuit, programmable logic device, programmable gate array, or other device capable of receiving and manipulating input and output signals consistent with the principles of the invention. The processor 70 and decoder 90 may also include analog components such as operational amplifiers and transistors, discrete logic components, or be a combination of analog, discrete logic, and other processing components.

In one embodiment, the receiver 82 applies known techniques to decode PCM signals impressed upon the optical transducer 85. The optical transducer 85 may be a phototransistor, photodiode, or any other device capable of detecting incident light having the wavelength emitted by the LED 80. The decoder 90 receives a signal from the optical transducer and recovers PCM signals having a predetermined center frequency. The decoder 90 converts the recovered PCM signals into a data output signal at the data output 95. The processor 70 uses the same center frequency to encode the data signal using PCIM.

Figure 4:
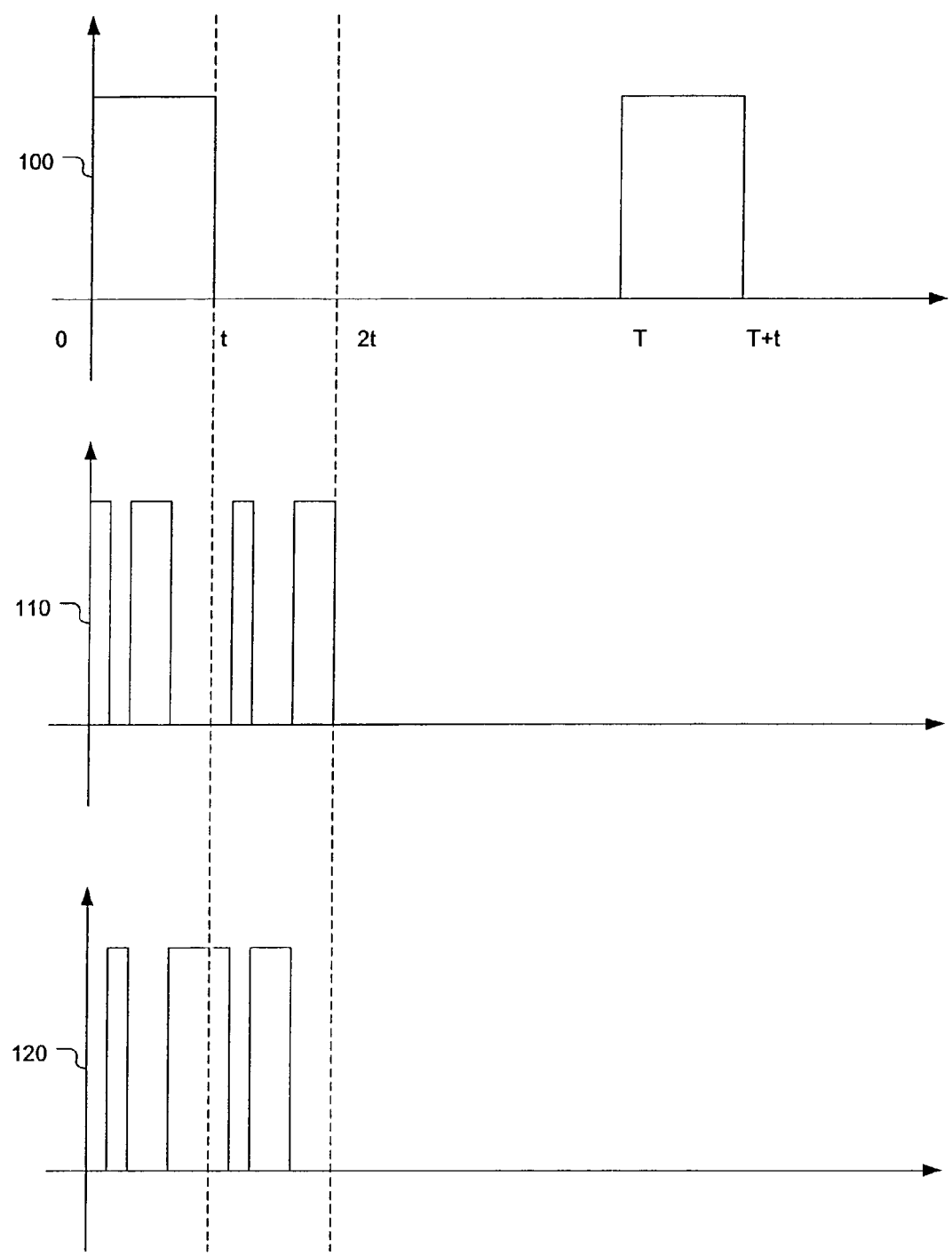
FIG. 4 shows the composition of a control signal according to the principles of the invention.

FIG. 4 shows the composition of a control signal according to the principles of the invention. The control signal of FIG. 4 is particularly applicable to those environments where it is desired to control illumination and transmit data within a shared optical channel. As shown, the PWM signal 100 is "on" from 0 to t and "off" from t to T. The duty cycle for this signal may be expressed as a ratio of the length of the "on" state, t, to the period of the entire PWM signal, T. A data signal 110 is also shown. The data signal 110 preferably has a shorter period than the PWM signal 100, with the period determined by the center frequency of the decoder 90. In order to maintain the duty cycle of the PWM signal 100 within a control signal 120, an inverted form of the data signal 110 is also generated by the processor 70, beginning at the end of the original PWM signal 100. The control signal 120 is generated by taking an exclusive OR ("XOR") of the PWM signal 100 and the data signal 110. The control signal 120 is transmitted to the LED driver 75 where it is used to activate the LED 80. In response to the control signal 120, the LED 80 generates visible light having a color determined by the LED 80 and an intensity determined by the average "on" time of the control signal 120. The applications incorporated by reference herein provide further details as to PWM and other carrier wave techniques, and it should be understood that the method of PWM control disclosed herein is but one illustrative embodiment, and that other PWM embodiments are within the scope of the present disclosure.

The visible light from the LED 80 falls upon the optical transducer 85, which generates signals to the decoder 90. The decoder 90 demodulates the PCM data contained in the visible light to reconstruct the data output signal. It will be appreciated that, in this embodiment, the data carrying capacity of the control signal 120 will depend upon the duty cycle of the PWM signal 100 and the data signal 110. For example, an illumination signal indicating that the LED 80 should always be off (duty cycle of 0%) or always be on (duty cycle of 100%) has no information carrying capacity. It will further be appreciated that other modulation schemes are known, such as pulse position modulation ("PPM"), and may be used to modulate the data signal 110 according to the principles of the invention, provided that the modulation is performed in a manner that preserves the average "on" time indicated by the duty cycle of the PWM signal 100.

Other techniques for combining lighting functions and data communication functions are possible. For example, data signals may be transmitted with infrared LEDs, and illumination signals may be transmitted using visible light LEDs. In an embodiment, only a particular color of visible light LED may be used to transmit data, with a matching optical filter on the receiver. In another embodiment, data may be transmitted for a time, followed by illumination.

Data and illumination signals may alternate on a fixed period, or data may be transmitted only during a power up phase, or data may be preceded by a modulated data header which signals to a receiver that data will follow. In another embodiment, lighting may be provided by any conventional light source, such as an incandescent or flourescent light, while data may be transmitted using a modulated LED. Any of these techniques, or other techniques, may be used to practice a networked lighting system.

Figure 5:
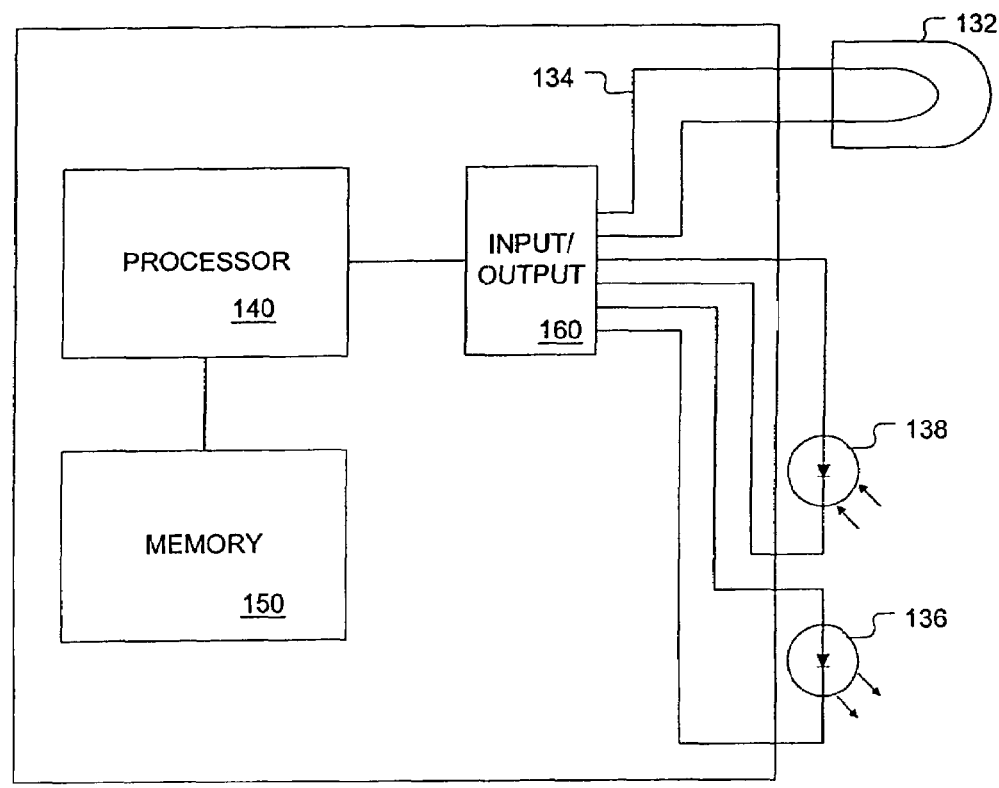
FIG. 5 shows a lighting subsystem according to the principles of the invention.

FIG. 5 shows a lighting subsystem according to the principles of the invention. A lighting subsystem 130 may include a light source 132 responsive to an illumination signal 134, and a transmitter 136 and a receiver 138 such as the transmitter and receiver described in reference to FIG. 1. It will be appreciated that, although not shown in FIG. 3, the transmitter 136 and the light source 132 may be embodied in a single optical device, such as an LED described above. The lighting subsystem 130 may also include a processor 140, a memory 150, and input/output circuitry 160.

The transmitter 136 and the receiver 138 may provide a physical link to a lighting network over which the lighting subsystem 130 may send and receive data. The lighting subsystem 130 may receive illumination data from the receiver 138, as well as any other data or control signals that may be transmitted over a network. The light source 132 may be any known light source, including an LED light, programmable LED array, incandescent lamp, floodlight, high-voltage spotlight, track light, flourescent light, neon light, halogen light, or any other illumination source. The input/output circuitry 160 includes any suitable analog/digital and digital/analog circuitry, and other signal processing circuitry for transforming signals from the processor 140 into signals for the light source 132 and the transmitter 136, as well as for transforming signals from the receiver 138 into signals for the processor 140. For example, the input/output circuitry 160 may include the components described in reference to FIG. 3.

The memory 150 may store information relating to the lighting subsystem 132. For example, the memory 150 may store a date of manufacture for the lighting subsystem 132, a serial number of the lighting subsystem 132, an address of the lighting subsystem 132, capabilities of the lighting subsystem 132, and any settings or other information relating to the lighting subsystem 132. The address may be an identifier or digital signature that uniquely identifies the lighting subsystem 132 from among a plurality of lighting subsystems 132 or other devices. The address may then be used as a source or destination address for data carried over a lighting network, such as the network described below. The date of manufacture and the serial number may be used, for example, to identify the lighting subsystems 132 and any known capabilities of the lighting subsystem 132. Or, as noted above, specific capabilities of the lighting subsystem 132 may be explicitly communicated using the transmitter 136.

Settings may also be stored in the memory 150. This may include any settings corresponding to the lighting subsystem 132. For example, where the lighting subsystem 132 includes a programmable LED array, the settings may include programming information for the array. The settings may also include, for example, configurable lighting effects such as fades, timers, or the like. The settings may also include a flag for the lighting subsystem 132 to operate as a control unit for other lighting subsystems 132, or to operate as a communication node for other lighting subsystems 132, or to operate as a slave to another device.

It will be appreciated that a number of memory devices are known, and may be used in a lighting subsystem 132 according to the principles of the invention. For example, the memory 150 may be a flash memory, read-only memory, or some other non-volatile memory, or the memory may be a random access memory, dynamic random access memory, or some other volatile memory.

The lighting subsystem 132 may include a processor 140. The processor 140 may be a microprocessor, microcontroller, application specific integrated circuit, programmable logic device, or any other device that may be configured to control operation of the lighting subsystem 132. Where the lighting subsystem 132 is a battery powered device, the processor 140 may be a low-powered processor. The memory 150 of the lighting subsystem 132 may include programming code for autonomous execution by the processor 140 of the lighting subsystem 132. The programming code may include information to control lighting by the lighting subsystem 132, or information to control operation of the lighting subsystem 132 as a communication node in a lighting network. The programming code may include one or more diagnostic routines to automatically test capabilities of the lighting subsystem 132 each time that the lighting subsystem 132 is powered up, or at other times when specifically requested, such as by control signals received on the receiver 138.

Figure 6:
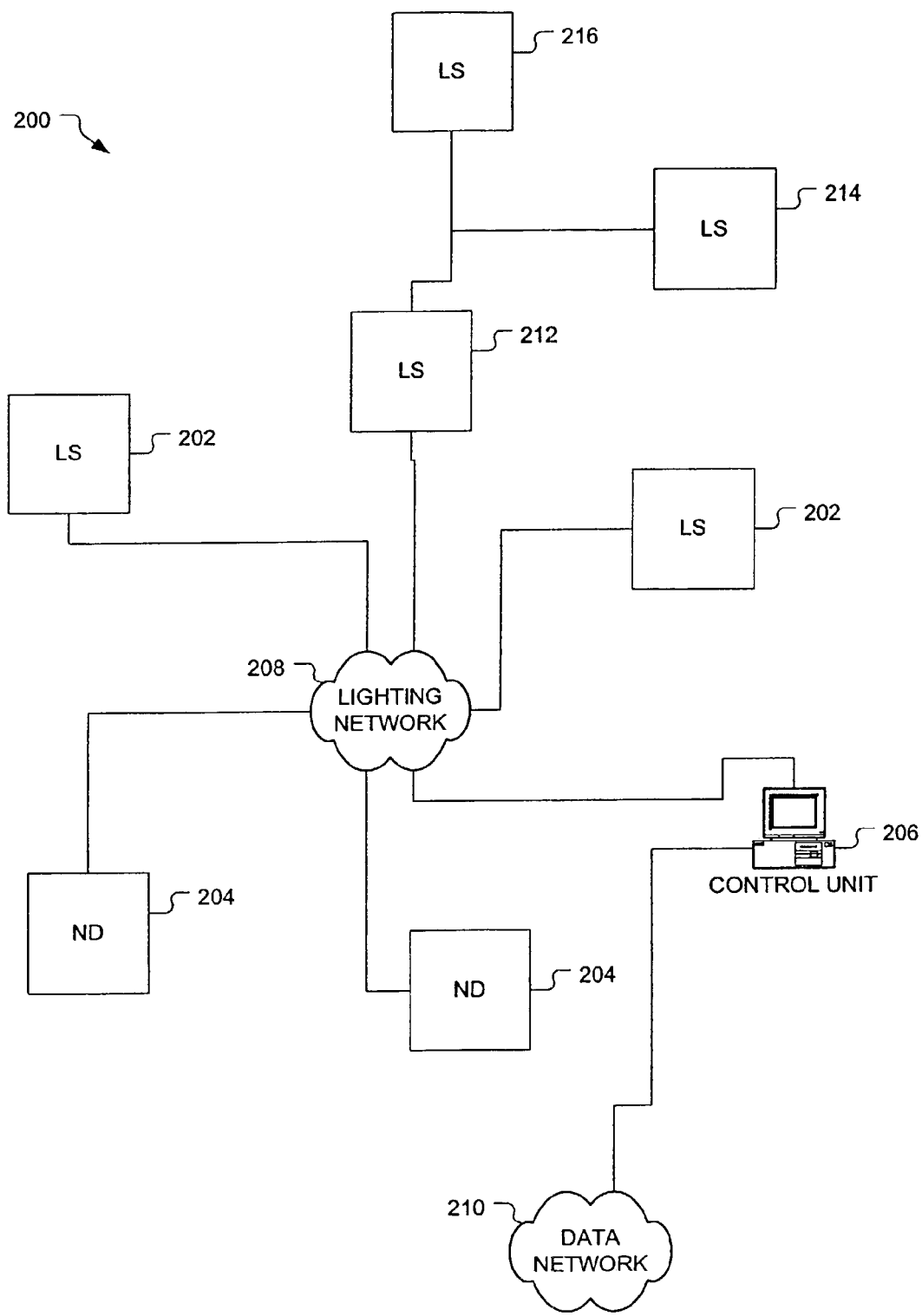
FIG. 6 shows a networked lighting system according to the principles of the invention.

FIG. 6 shows a networked lighting system according to the principles of the invention. A networked lighting system 200 may generally include a plurality of lighting subsystems 202, 212, 214, 216, other networked devices 204, and one or more control units 206, sharing data over a lighting network 208. The control unit 206 may also be connected to a data network 210 for remote access to the control unit 206 and the lighting network 208.

Each of the lighting subsystems 202 may be a lighting subsystem such as the one described in reference to FIG. 5. Each lighting subsystem 202 may be connected to the lighting network 208 to form a communicating relationship with other lighting subsystems 202, other networked devices 204, and the control unit 206.

One of the lighting subsystems 212 is shown operating as a node in the lighting network 208. The lighting subsystem 212 includes the components of one of the lighting subsystems 202. The lighting subsystem 212 is configured to operate as a node that connects additional lighting subsystems 214, 216 to the lighting network 208, as well as to the control unit 206 and the networked devices 204 connected thereto. The additional lighting subsystems 214, 216 may additionally be configured to communicate with one another independent of the lighting network 208, in order to exchange control information, such as information to provide a totally intensity of illumination within an area, or to control a color of illumination through mixing of color sources available at each of the lighting subsystems 214, 216.

Turning now to the networked devices 204, each networked device 204 may include a receiver and a transmitter for communicating over the lighting network 208, as well as a processor and a memory such as the processor and the memory described above. Networked devices 204 may include lighting fixtures, thermostats, motion sensors, light sensors, timers, switches, power controls, fans, electronically operable window blinds and curtains, alarms or audible signal generators, or any other sensor, transducer, or actuator for operation with the lighting network 208. Other networked devices 204 which may be used with the invention may include devices such as smoke making machines, audio and video presentation equipment, strobe lights, electronic doors, and so forth.

According to the principles of the invention, the networked device 204 may physically situated such that the networked device 204 may communicate through the lighting network 208, and may provide sensor data and/or receive control information without a need for wired connections to other devices connected to the lighting network 208. As with the lighting subsystems 202, 212, 214, 216, the networked devices 204 may be configured to operate as communication nodes in the lighting network 208, or to operate in slave or control configurations.

One or more of the lighting subsystems 202, 204, 206, 210, 212, 214 may be configured to operate independently, each sending and/or receiving data over the lighting network 208 to other ones of the lighting subsystems. Thus the network 208 may be decentralized, consisting of one or more subnetworks interconnecting, for example, a first subgroup of the lighting subsystems 202, 204, 206 in a first subnetwork, and subconnecting a second subgroup of the lighting subsystems 210, 212, 214 in a second subnetwork. The network 208, or any subnetwork thereof, may be configured to operate as a peer network shared by a number of autonomous network nodes, or the network 208, or any subnetwork thereof, may be configured to operate as a client-server network with one lighting subsystem arbitrating communications among the other lighting subsystems. In either a peer network or a client-server network, one node may operate as a master that controls operation of other lighting subsystems connected to the subnetwork or the network 208.

The networked lighting system 200 may include a control unit 206. The control unit 206 may be a programmable device such as a personal computer, or any other device that can receive user input and maintain control information for the lighting network 208. The control unit 206 may include a transmitter and receiver for establishing communications over the lighting network 208. There may also be provided any other software tools designed for management of the lighting network 208, including an interface to manage, monitor, control, and troubleshoot the lighting network 208, as well as perform other functions consistent with the lighting network 208. For example, the control unit 206 may be used to download control programs to one or more of the lighting subsystems 202 or networked devices 204 for autonomous execution on those devices and subsystems. Or the control unit 206 may be used to synchronize effects or control of environmental conditions provided by the system 200, and the networked devices 204 and the lighting subsystems 202 attached thereto.

The control unit 206 may also be connected to a conventional data network 210, such as a local area network, wide area network, private area network, or a public network such as the Internet. Through this connection, control information for the lighting network 208 may be provided remotely through any device connected to the data network 210. Additionally, data from sensors associated with the lighting subsystems 202 or the networked devices 204 may be retrieved and viewed from a remote device connected to the data network 210, either for simple monitoring functions or for interactive control of the system 200. The control unit 206 may include known security features such as password protection and secure communications, in order to maintain privacy of data available from the lighting network 208, and to prevent unauthorized tampering with devices attached to the lighting network 208.

The networked lighting system 200 may be used in any controlled lighting environment, such as a theater lighting system, home lighting system, a commercial display such as a window display, interior lighting system for social functions, exterior lighting system configured in an architectural or landscaping design, or any other system where information may be usefully communicated among a number of lighting subsystems. For example, a spectral sensor may be provided as a networked device 204 and may receive illumination from a number of lighting subsystems 202, each of which contains a different colored light source. The spectral sensor may communicate with the lighting subsystems 202 to automatically provide lighting of a predetermined color.

The networked lighting system 200 may also be used as a replacement for other communications networks, such as wireless computer networks. That is, the data carrying functions of lighting subsystems may be used, independent of the lighting functions, to form data links between computers, or other devices that might typically be networked, that bridge physical gaps between connection points of the computers.

Figure 7:
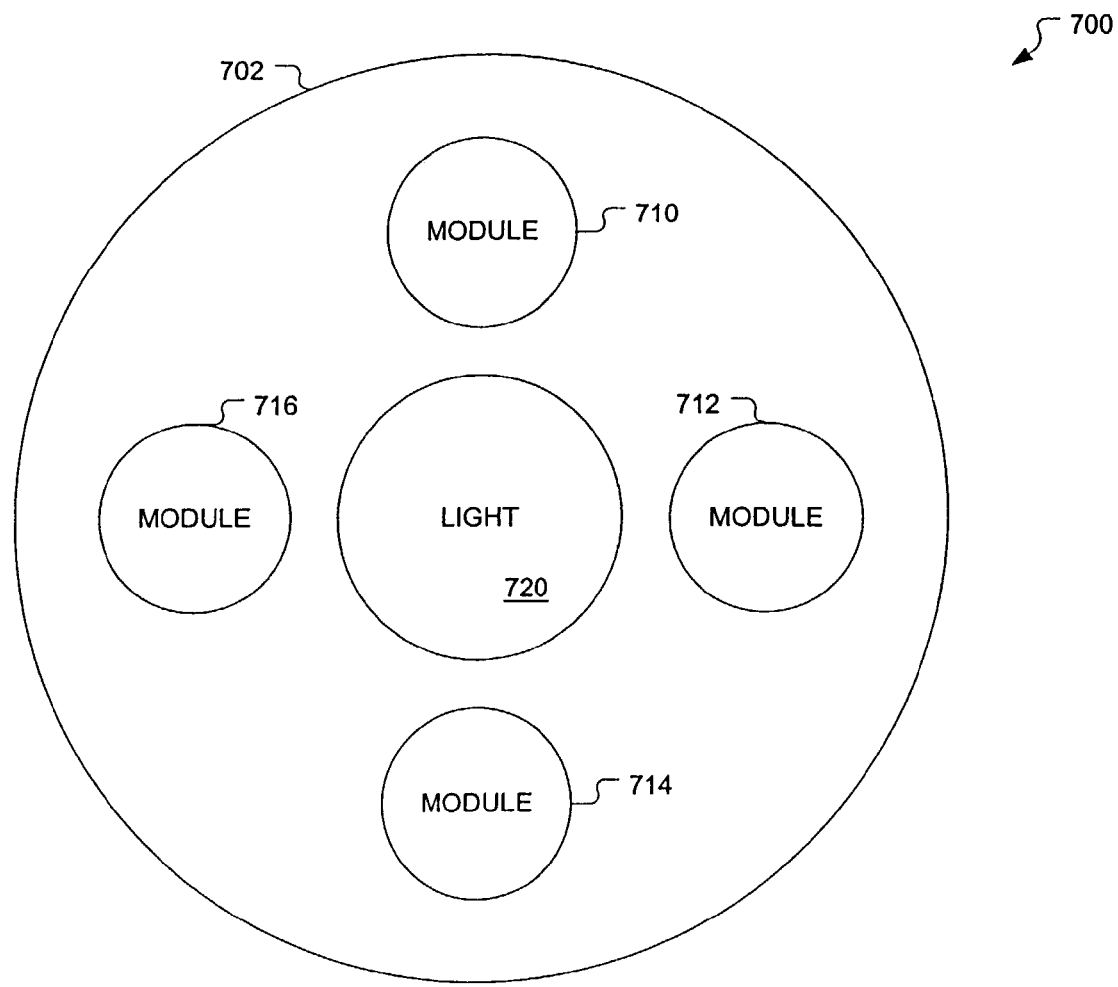
FIG. 7 shows a modular lighting subsystem according to the principles of the invention.

FIG. 7 shows a modular lighting subsystem according to the principles of the invention. The modular lighting subsystem 700 may include a base 702 that forms a universal platform for a number of modules 710, 712, 714, 716. The base 702 may include a light 720, such as an LED source or some other light source. The light 720 may form a discrete lighting area, such as a lens, within the base 702, or the base 702 may be formed of a diffusing material so that the light 720 provides illumination throughout the base 702. It will be appreciated that, although the base 702 is shown in FIG. 7 as circular in shape, that the base 702 may have any shape, and may include hooks, screw holes, adhesive, or other components for mounting in a location. The base 702 may also include an electrical cord and a plug for attachment to, for example, an 110V AC outlet, or a low voltage DC outlet.

Each module 710, 712, 714, 716 may fit into a cradle within the base 702, which may be any shape adapted to receive the module. The cradle may include electrical contacts for forming power connections with the modules, and may also include electrical contacts for forming data connections between the base 702 and the modules 710, 712, 714, 716, as well as among the modules 710, 712, 714, 716. The modules may include components for expanding or changing the functionality of the lighting subsystem 700. For example, a first module 710 may provide power, and may include a battery or a converter for converting an external power source into a power source suitable for the lighting subsystem 700. A second module 712 may provide input/output, including a network interface such as a physical interface to an infrared or radio frequency network, and any network protocol stack required to form communication links between the lighting subsystem 700 and other nodes of a network. A third module 714 may provide sensors such as microphones, temperature sensors, digital cameras, or, for example, any of the sensors discussed above. A fourth module 716 may provide output devices such as a speaker, an LED or LCD display, additional lights or LEDs, or some other output device. Other modules may include, for example, a processor or other device. In one embodiment, each cradle is the same, so that any module may be inserted into any cradle. In this embodiment, the base 702 may include circuitry for detecting module types and forming a suitable connection to each module.

Figure 8:
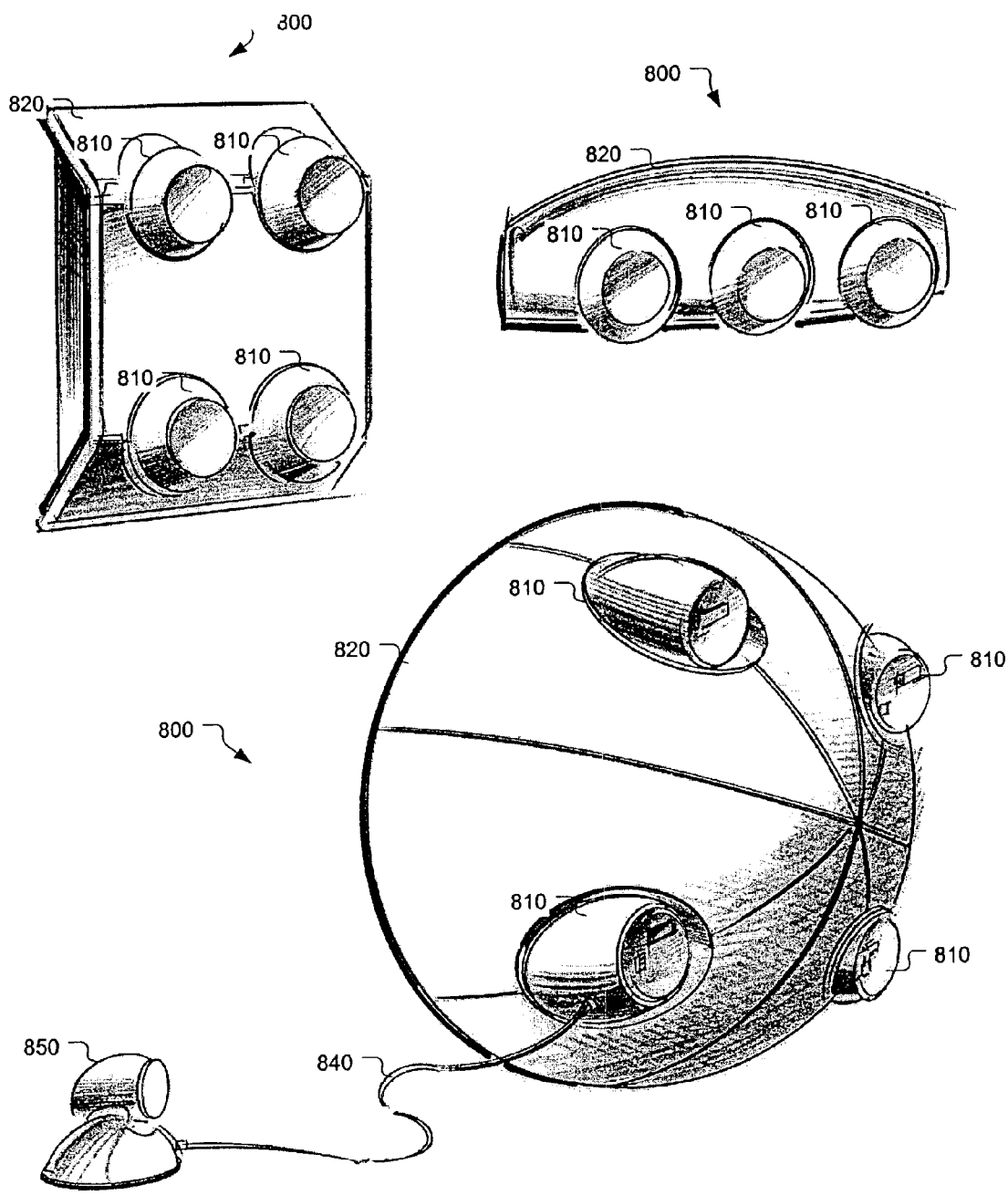
FIG. 8 shows several embodiments of modular lighting subsystems according the principles of the invention.

FIG. 8 shows several embodiments of modular lighting subsystems according to the principles of the invention. In a modular lighting subsystem 800, each module 810 may provide additional functionality such as sensing and communication. In FIG. 8, the modules 810 may connect to a base 820 with a simple mechanical and/or electrical connection. Suitable mechanisms for forming connections are known in the art, such as cellular phone and personal digital assistant power and data connections, light bulb connections, dual in-line pin package sockets, zero insertion-force sockets, cradles, modular jacks for phone and network connections, electrical sockets, game cartridge slots for gaming platforms, docking stations for computers, and so forth. An additional locking feature such as a mechanical level or bayonet mounting may be used to insure that all modules 810 remain in place as others are removed and inserted.

External cabling 840 to high-bandwidth devices such as a camera 850 may be included in a module 810 as shown, or directly attached to a port in the base 820. The base 820 may provide a central connection for a variety of sensing and communications modules 810. A variety of physical forms can be made that would fit into different styles and decors without appearing to be out of place, as shown generally in FIG. 8. The functionality may be the same for each base 820, or the functionality may be specialized for one or more different types of bases 820.

Figure 9:
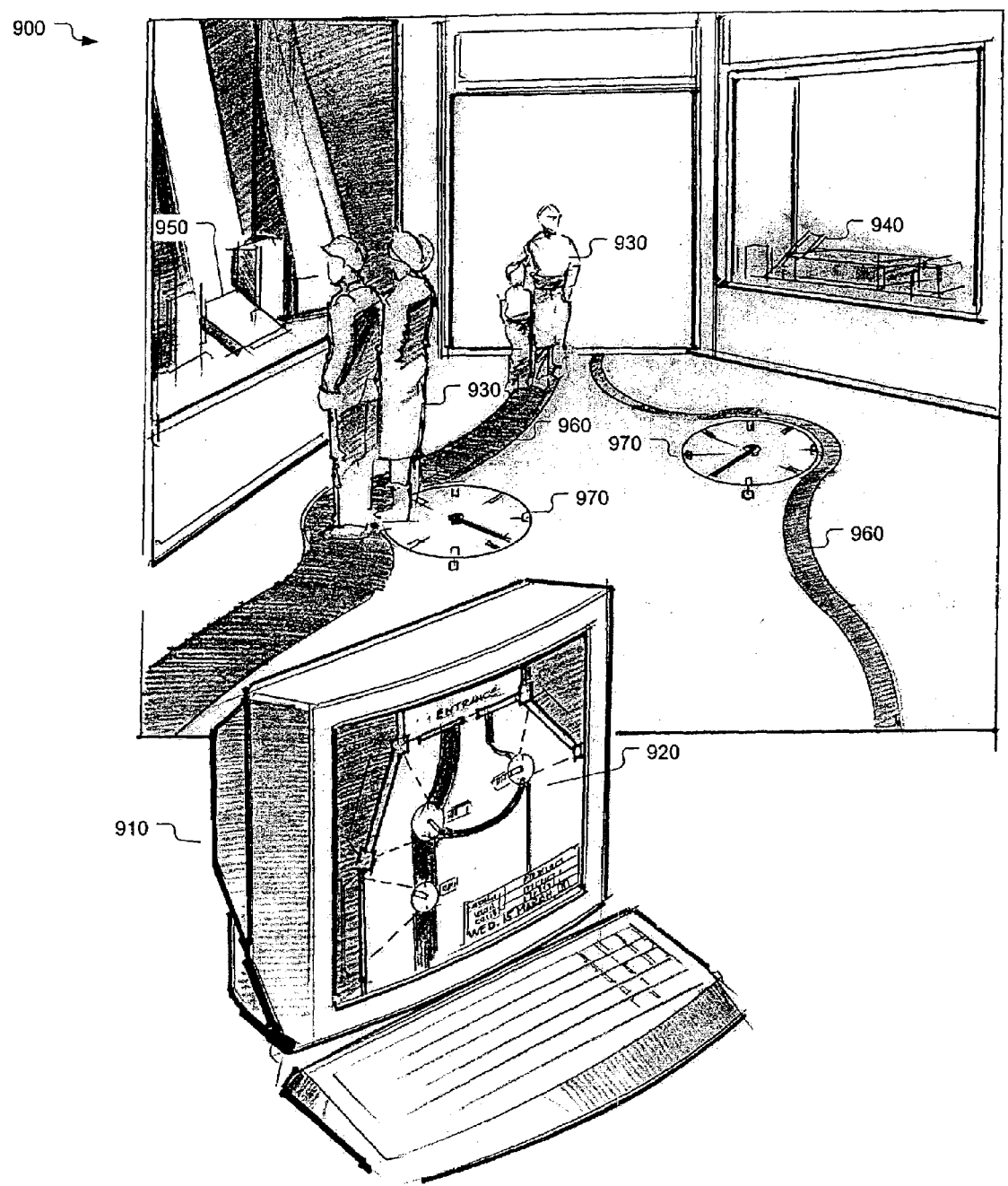
FIG. 9 shows a retail environment according to the invention.

FIG. 9 shows a retail environment according to the invention. Within the retail environment 900, a computer monitor 910 may display information in a useful graphic form of a plan view 920 of the store that includes information relating to, for example, time and traffic through the store. The plan view 920 can take many forms, including graphs, tabular data, bar charts, and the like. As one example, graphical representations may offer a powerful and easy to interpret means of showing relevant data.

In the retail environment 900 of FIG. 9, people 930 may view, for example, two displays: a first display 940 to the left and a second display 950 to the right. Both displays 940, 950 may attract people though attention-getting visual merchandising techniques. Through a lighting network according to the invention, sensors such as cameras with image interpretation or proximity sensors, may be used to detect and track people, and to display the location of people on the plan-view 920 of one of the displays 940, 950.

In this way, the peregrinations of patrons can be plotted perfectly. In one embodiment, lines 960 on the floor and one or more clocks 970 may graphically represent the paths and the duration of patrons during the course of the day. The thickness or width of the lines 960 may represent the amount of traffic along that path. The clocks 970 may represent an average amount of time spent at a display 940, 950. In this way, visual-merchandising techniques can be quickly and easily compared for their attention-getting ability, percentage of traffic effectiveness, and interaction. It will be appreciated that, although shown on a floor of the retail environment 900 to illustrate a relationship between people 930 and the lines 960 and clocks 970, the lines 960 and clocks 970 might be displayed on the plan view 920 of the computer monitor 910 for review by a store owner or manager.

Additionally, the displays 940 and 950 themselves can be monitored and controlled with respect to customer interaction. For example, changing lighting, or kinetic devices can be compared and analyzed for their ability to attract customers. The displays 940 and 950 themselves may be used as a part of a data collection process that includes other sensors throughout the retail environment 900.

Figure 10:
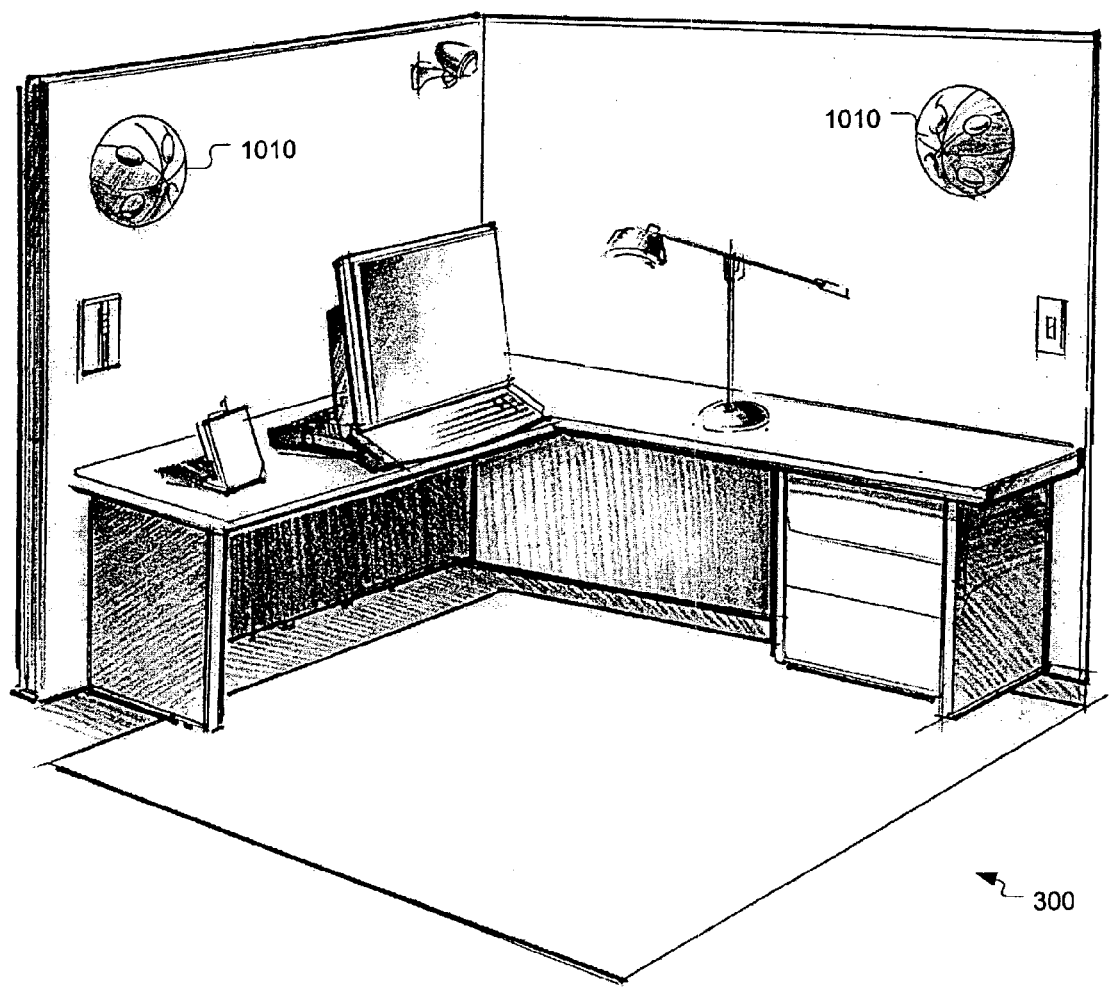
FIG. 10 shows an office environment according to the invention.

FIG. 10 shows an office environment according to the invention. The office environment 1000, whether home or work, offers another venue for building automation systems. Lighting module subsystems 1010, shown mounted to two walls, provide capability for networking and sensors for detecting if people are in the office. Wireless and wired networks may use the lighting module subsystems 1010 as well, as input or output devices, nodes, or communication hubs. A system using lighting module subsystems 1010 within the office environment 1000 can detect pilferage and unwanted employee intrusions, as well as providing a communications conduit for the office resident. The lighting module subsystem 1010 may also support TCP/IP networking, and may provide for web browsing capability external to the office. The networked capabilities may thus simplify data collection and reporting capabilities in the office environment 1000, and simplify office networking, either by creating a network or supplementing an existing network.

Portable devices, as they are brought into and out of the office environment 1000, can link to the lighting module subsystems 1010 using a variety of protocols which may provide transparent connection, or explicit, user controlled connections.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A lighting network comprising at least first and second apparatus, each of the first and second apparatus comprising:
   at least one LED-based lighting element configured to illuminate an area with visible light;
   at least one processor configured to be coupled to a data network; and
   at least one input device coupled to the at least one processor and configured to receive information,
   wherein the processor is configured to pass a representation of the received information to the data network, and
   wherein a first processor of the first apparatus is coupled to a second processor of the second apparatus via the data network.

2. The lighting network of claim 1, wherein the data network includes a physical medium.

3. The lighting network of claim 1, wherein the data network includes at least one wireless link.

4. The lighting network of claim 1, wherein the at least one input device of at least the first apparatus includes at least one of an electromagnetic signal receiver, an acoustic signal receiver, a radiation sensor, a magnetic sensor, a camera, a motion detector, a proximity detector, a position sensor, a thermal sensor, a humidity sensor, a chemical sensor, a microphone, a piezoelectric sensor, an ultrasonic sensor, a force sensor, a pressure sensor, and a vibration sensor.

5. The lighting network of claim 4, wherein the at least one LED-based lighting element of at least the first apparatus is coupled to the at least one processor of the first apparatus and configured to be responsive to lighting data received from the data network.

6. The lighting network of claim 5, wherein the lighting data received from the data network is based at least in part on the information received by the at least one input device of at least one of the first apparatus and the second apparatus.

7. The lighting network of claim 1, wherein at least the first apparatus further includes at least one output device coupled to the at least one processor and configured to perform at least one non-lighting function in response to non-lighting data received from the data network.

8. The lighting network of claim 7, wherein the at least one output device includes at least one of an electromagnetic transmitter, an acoustic transmitter, an actuator, and a positioning mechanism.

9. The lighting network of claim 8, wherein the at least one input device of at least the first apparatus includes at least one of an electromagnetic signal receiver, an acoustic signal receiver, a radiation sensor, a magnetic sensor, a camera, a motion detector, a proximity detector, a position sensor, a thermal sensor, a humidity sensor, a chemical sensor, a microphone, a piezoelectric sensor, an ultrasonic sensor, a force sensor, a pressure sensor, and a vibration sensor.

10. The lighting network of claim 9, wherein the at least one LED-based lighting element of at least the first apparatus is coupled to the at least one processor of the first apparatus and configured to be responsive to lighting data received from the data network.

11. The lighting network of claim 10, wherein the lighting data received from the data network is based at least in part on the information received by the at least one input device of at least one of the first apparatus and the second apparatus.

12. The lighting network of claim 9, wherein the non-lighting data received from the data network is based at least in part on the information received by the at least one input device of at least one of the first apparatus and the second apparatus.

13. The lighting network of claim 9, wherein the data network includes a physical medium.

14. The lighting network of claim 9, wherein the data network includes at least one wireless link.

15. The lighting network of claim 9, wherein the first processor and the second processor are addressable processors that are responsive to particular information on the data network based at least in part on an address associated with the particular information.

16. The lighting network of claim 9, wherein data is transported via the data network using one of a TCP/IP, Ethernet, USB and DMX protocol.

17. A building including the lighting network of claim 9.

18. The building of claim 17, wherein at least one of the first apparatus and second apparatus is configured as a ceiling or overhead light fixture in the building.

19. The building of claim 17, wherein the visible light generated by at least one of a first LED-based lighting element of the first apparatus and a second LED-based lighting element of the second apparatus includes white light.

20. The building of claim 18, wherein the visible light generated by at least one of a first LED-based lighting element of the first apparatus and a second LED-based lighting element of the second apparatus includes variable color light.

21. The building of claim 18, wherein the visible light generated by at least one of a first LED-based lighting element of the first apparatus and a second LED-based lighting element of the second apparatus includes white light.

22. The lighting network of claim 9, wherein the visible light generated by at least one of a first LED-based lighting element of the first apparatus and a second LED-based lighting element of the second apparatus includes variable color light.

23. The lighting network of claim 9, wherein the visible light generated by at least one of a first LED-based lighting element of the first apparatus and a second LED-based lighting element of the second apparatus includes white light.

24. The lighting network of claim 1, wherein the visible light generated by at least one of a first LED-based lighting element of the first apparatus and a second LED-based lighting element of the second apparatus includes variable color light.

25. The lighting network of claim 1, wherein the visible light generated by at least one of a first LED-based lighting element of the first apparatus and a second LED-based lighting element of the second apparatus includes white light.

26. The lighting network of claim 1, wherein the first processor and the second processor are addressable processors that are responsive to particular information on the data network.

27. The lighting network of claim 1, wherein data is transported via the data network using one of a TCP/IP, Ethernet, USB and DMX protocol.

28. A building including the lighting network of claim 1.

29. The building of claim 28, wherein the visible light generated by at least one of a first LED-based lighting element of the first apparatus and a second LED-based lighting element of the second apparatus includes variable color light.

30. The building of claim 28, wherein the visible light generated by at least one of a first LED-based lighting element of the first apparatus and a second LED-based lighting element of the second apparatus includes white light.

31. The building of claim 28, wherein at least one of the first apparatus and second apparatus is configured as a ceiling or overhead light fixture in the building.

32. The building of claim 31, wherein the visible light generated by at least one of a first LED-based lighting element of the first apparatus and a second LED-based lighting element of the second apparatus includes variable color light.

33. The building of claim 31, wherein the visible light generated by at least one of a first LED-based lighting element of the first apparatus and a second LED-based lighting element of the second apparatus includes white light.

34. The building of claim 17, wherein the visible light generated by at least one of a first LED-based lighting element of the first apparatus and a second LED-based lighting element of the second apparatus includes variable color light.

35. A lighting network comprising:
at least first and second apparatus, each of the apparatus comprising:
at least one LED-based lighting element configured to illuminate an area with visible light;
at least one processor configured to be coupled to a data network;
at least one input device coupled to the at least one processor and configured to receive information; and
at least one output device coupled to the at least one processor and configured to perform at least one non-lighting function in response to non-lighting data received from the data network,
wherein for each apparatus:
the processor is configured to pass a representation of the received information to the data network;

the at least one output device includes at least one of an electromagnetic transmitter, an acoustic transmitter, an actuator, and a positioning mechanism; and the at least one input device includes at least one of an electromagnetic signal receiver, an acoustic signal receiver, a radiation sensor, a magnetic sensor, a camera, a motion detector, a proximity detector, a position sensor, a thermal sensor, a humidity sensor, a chemical sensor, a microphone, a piezoelectric sensor, an ultrasonic sensor, a force sensor, a pressure sensor, and a vibration sensor, and wherein:

a first processor of the first apparatus is coupled to a second processor of the second apparatus via the data network;

the data network includes at least one wireless link; and at least one of the first processor and the second processor is configured to control at least one LED-based lighting element to perform simultaneously at least one lighting function and at least one non-lighting information transmission function so as to transmit wireless information via the at least one wireless link.

36. The lighting network of claim 35, wherein the at least one of the first processor and the second processor is configured to control the at least one LED-based lighting element to perform simultaneously the at least one lighting function and the at least one non-lighting information transmission function so as to transmit the wireless information via the visible light.

37. The lighting network of claim 36, wherein the visible light generated by at least one of a first LED-based lighting element of the first apparatus and a second LED-based lighting element of the second apparatus includes white light.

38. The lighting network of claim 36, wherein the visible light generated by at least one of a first LED-based lighting element of the first apparatus and a second LED-based lighting element of the second apparatus includes variable color light.

39. A lighting network, comprising:
a first lighting apparatus, including:
at least one first LED-based lighting element configured to generate visible light;
at least one first processor coupled to a data network; and
at least one first input device coupled to the at least one first processor and configured to receive first information,
wherein the at least one first processor is configured to pass a representation of the first information to the data network; and
a second lighting apparatus, including:
at least one second LED-based lighting element configured to generate visible light;
at least one second processor coupled to the data network; and
at least one second input device coupled to the at least one second processor and configured to receive second information,
wherein the at least one second processor is configured to pass a representation of the second information to the data network.

40. The lighting network of claim 39, wherein the visible light generated by at least one of a first LED-based lighting element of the first apparatus and a second LED-based lighting element of the second apparatus includes white light.

41. The lighting network of claim 39, wherein the first processor and the second processor are addressable processors that are responsive to particular information on the data network.

42. The lighting network of claim 39, wherein data is transported via the data network using one of a TCP/IP, Ethernet, USB and DMX protocol.

43. A building including the lighting network of claim 39.

44. The building of claim 43, wherein the visible light generated by at least one of a first LED-based lighting element of the first apparatus and a second LED-based lighting element of the second apparatus includes variable color light.

45. The building of claim 43, wherein the visible light generated by at least one of a first LED-based lighting element of the first apparatus and a second LED-based lighting element of the second apparatus includes white light.

46. The building of claim 43, wherein at least one of the first apparatus and second apparatus is configured as a ceiling or overhead light fixture in the building.

47. The building of claim 46, wherein the visible light generated by at least one of a first LED-based lighting element of the first apparatus and a second LED-based lighting element of the second apparatus includes variable color light.

48. The building of claim 46, wherein the visible light generated by at least one of a first LED-based lighting element of the first apparatus and a second LED-based lighting element of the second apparatus includes white light.

49. The lighting network of claim 39, wherein the visible light generated by at least one of a first LED-based lighting element of the first apparatus and a second LED-based lighting element of the second apparatus includes variable color light.

50. A lighting network comprising:
at least first and second apparatus, each of the apparatus comprising:
at least one LED-based lighting element configured to illuminate an area with visible light;
at least one processor configured to be coupled to a data network; and
at least one input device coupled to the at least one processor and configured to receive information,
wherein:
for each apparatus, the processor is configured to pass a representation of the received information to the data network;
a first processor of the first apparatus is coupled to a second processor of the second apparatus via the data network;
the data network includes at least one wireless link; and
at least one of the first processor and the second processor is configured to control at least one LED-based lighting element to perform simultaneously at least one lighting function and at least one non-lighting information transmission function so as to transmit wireless information via the at least one wireless link.

51. The lighting network of claim 50, wherein the at least one of the first processor and the second processor is configured to control the at least one LED-based lighting element to perform simultaneously the at least one lighting function and the at least one non-lighting information transmission function so as to transmit the wireless information via the visible light.

52. The lighting network of claim 51, wherein the visible light generated by at least one of a first LED-based lighting element of the first apparatus and a second LED-based lighting element of the second apparatus includes white light.

53. The lighting network of claim 51, wherein the first processor and the second processor are addressable processors that are responsive to particular information on the data network.

54. The lighting network of claim 51, wherein data is transported via the data network using one of a TCP/IP, Ethernet, USB and DMX protocol.

55. A building including the lighting network of claim 51.

56. The building of claim 55, wherein the visible light generated by at least one of a first LED-based lighting element of the first apparatus and a second LED-based lighting element of the second apparatus includes variable color light.

57. The building of claim 55, wherein the visible light generated by at least one of a first LED-based lighting element of the first apparatus and a second LED-based lighting element of the second apparatus includes white light.

58. The building of claim 55, wherein at least one of the first apparatus and second apparatus is configured as a ceiling or overhead light fixture in the building.

59. The building of claim 58, wherein the visible light generated by at least one of a first LED-based lighting element of the first apparatus and a second LED-based lighting element of the second apparatus includes variable color light.

60. The building of claim 58, wherein the visible light generated by at least one of a first LED-based lighting element of the first apparatus and a second LED-based lighting element of the second apparatus includes white light.

61. The lighting network of claim 51, wherein the visible light generated by at least one of a first LED-based lighting element of the first apparatus and a second LED-based lighting element of the second apparatus includes variable color light.

62. A lighting network comprising at least first and second apparatus, each of the first and second apparatus comprising:
at least one LED-based lighting element configured to illuminate an area with visible light;
at least one processor configured to be coupled to a data network; and
at least one output device coupled to the at least one processor and configured to perform at least one non-lighting function in response to non-lighting data received from the data network,
wherein a first processor of the first apparatus is coupled to a second processor of the second apparatus via the data network.

63. The lighting network of claim 62, wherein the data network includes at least one wireless link.

64. The lighting network of claim 62, wherein the visible light generated by at least one of a first LED-based lighting element of the first apparatus and a second LED-based lighting element of the second apparatus includes variable color light.

65. The lighting network of claim 62, wherein the visible light generated by at least one of a first LED-based lighting element of the first apparatus and a second LED-based lighting element of the second apparatus includes white light.

66. The lighting network of claim 62, wherein the first processor and the second processor are addressable processors that are responsive to particular information on the data network.

67. The lighting network of claim 62, wherein data is transported via the data network using one of a TCP/IP, Ethernet, USB and DMX protocol.

68. A building including the lighting network of claim 62.

69. The building of claim 68, wherein the visible light generated by at least one of a first LED-based lighting element of the first apparatus and a second LED-based lighting element of the second apparatus includes variable color light.

70. The building of claim 68, wherein the visible light generated by at least one of a first LED-based lighting element of the first apparatus and a second LED-based lighting element of the second apparatus includes white light.

71. The building of claim 68, wherein at least one of the first apparatus and second apparatus is configured as a ceiling or overhead light fixture in the building.

72. The building of claim 71, wherein the visible light generated by at least one of a first LED-based lighting element of the first apparatus and a second LED-based lighting element of the second apparatus includes variable color light.

73. The building of claim 71, wherein the visible light generated by at least one of a first LED-based lighting element of the first apparatus and a second LED-based lighting element of the second apparatus includes white light.

74. The lighting network of claim 62, wherein the at least one output device of at least the first apparatus includes at least one of an electromagnetic transmitter, an acoustic transmitter, an actuator, and a positioning mechanism.

75. The lighting network of claim 74, wherein at least the first apparatus further includes at least one input device coupled to the at least one processor and configured to receive information, wherein the processor is configured to pass a representation of the received information to the data network.

76. The lighting network of claim 75, wherein the at least one input device includes at least one of an electromagnetic signal receiver, an acoustic signal receiver, a radiation sensor, a magnetic sensor, a camera, a motion detector, a proximity detector, a position sensor, a thermal sensor, a humidity sensor, a chemical sensor, a microphone, a piezoelectric sensor, an ultrasonic sensor, and a vibration sensor.

77. The lighting network of claim 76, wherein the at least one LED-based lighting element of at least the first apparatus is coupled to the at least one processor of the at least one first apparatus and configured to be responsive to lighting data received from the data network.

78. The lighting network of claim 77, wherein the lighting data received from the data network is based at least in part on the information received by the at least one input device of at least one of the first apparatus and the second apparatus.

79. The lighting network of claim 76, wherein the non-lighting data received from the data network is based at least in part on the information received by the at least one input device of at least one of the first apparatus and the second apparatus.

80. The lighting network of claim 62, wherein the data network includes a physical medium.

* * * * *